United States Patent [19]
Yamakawa et al.

[11] Patent Number: 6,144,520
[45] Date of Patent: *Nov. 7, 2000

[54] MAGNETIC TAPE MACHINE

[75] Inventors: Kengo Yamakawa; Katsumi Inazawa; Yukio Katsuyama; Kenichi Utsumi, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/873,382

[22] Filed: Jun. 12, 1997

Related U.S. Application Data

[62] Division of application No. 08/512,571, Aug. 8, 1995, Pat. No. 5,742,445.

[30] Foreign Application Priority Data

Dec. 22, 1994 [JP] Japan ..................... 6-320355
Feb. 7, 1995 [JP] Japan ..................... 7-018906

[51] Int. Cl.$^7$ .................................................. G11B 15/68
[52] U.S. Cl. .................................................. 360/92
[58] Field of Search ....................... 360/92, 96.5; 369/34, 369/36, 178, 191

[56] References Cited

U.S. PATENT DOCUMENTS

| | | | |
|---|---|---|---|
| 4,636,903 | 1/1987 | Rudi | 360/132 |
| 4,835,634 | 5/1989 | Ostwald | 360/92 |
| 4,912,575 | 3/1990 | Shiosaki | 360/92 |
| 5,101,387 | 3/1992 | Wanger et al. | 360/92 |
| 5,237,467 | 8/1993 | Marlowe | 360/92 |
| 5,432,419 | 7/1995 | Watanabe et al. | 318/560 |
| 5,508,859 | 4/1996 | Hu et al. | 360/92 |
| 5,781,368 | 7/1998 | Kotaki et al. | 360/92 |

FOREIGN PATENT DOCUMENTS

| | | | |
|---|---|---|---|
| 2-96965 | 4/1990 | Japan | 360/92 |
| 5314627 | 11/1993 | Japan . | |

*Primary Examiner*—David L. Ometz
*Attorney, Agent, or Firm*—Greer, Burns & Crain, Ltd.

[57] ABSTRACT

A storage apparatus including a drive unit for performing access of data on a cartridge recording medium; at least one cell for storing the cartridge recording medium, the at least one cell being inclined downward toward an interior portion of the storage apparatus. The storage apparatus has a housing having an opening for allowing direct insertion of the cartridge recording medium from outside of the storage apparatus into the at least one cell, and allowing for direct ejection of the cartridge recording medium from the at least one cell to the outside of the storage apparatus. An accessor is provided for transferring the cartridge recording medium between the at least one cell and the drive unit. A string screw is threadedly engaged with the accessor, and is rotationally driven by a motor. At least one cell is provided with an improper insertion preventing mechanism for preventing full insertion of the cartridge recording medium into the at least one cell in improper orientation of the cartridge recording medium, and includes a pawl for engaging with a notch formed on a side surface of the cartridge recording medium.

4 Claims, 27 Drawing Sheets

| ADR. | bit7 | bit6 | bit5 | bit4 | bit3 | bit2 | bit1 | bit0 |
|---|---|---|---|---|---|---|---|---|
| ... | ... | ... | ... | ... | ... | ... | ... | ... |
| 0020 | CELL7 | CELL6 | CELL5 | CELL4 | CELL3 | CELL2 | CELL1 | CELL0 |
| ... | ... | ... | ... | ... | ... | ... | ... | ... |
| 002X | CELLn | CELLn-1 | CELLn-2 | CELLn-3 | CELLn-4 | CELLn-5 | CELLn-6 | CELLn-7 |
| ... | ... | ... | ... | ... | ... | ... | ... | ... |
| 0030 | CLNG7 | CLNG6 | CLNG5 | CLNG4 | CLNG3 | CLNG2 | CLNG1 | CLNG0 |
| ... | ... | ... | ... | ... | ... | ... | ... | ... |
| 003X | CLNGn | CLNGn-1 | CLNGn-2 | CLNGn-3 | CLNGn-4 | CLNGn-5 | CLNGn-6 | CLNGn-7 |
| ... | ... | ... | ... | ... | ... | ... | ... | ... |
| 0040 | CTG7 | CTG6 | CTG5 | CTG4 | CTG3 | CTG2 | CTG1 | CTG0 |
| ... | ... | ... | ... | ... | ... | ... | ... | ... |
| 004X | CTGn | CTGn-1 | CTGn-2 | CTGn-3 | CTGn-4 | CTGn-5 | CTGn-6 | CTGn-7 |
| ... | ... | ... | ... | ... | ... | ... | ... | ... |

FIG. 21

MAGNETIC TAPE MACHINE

This is a divisional of application Ser. No. 08/512,571 filed on Aug. 8, 1995, now U.S. Pat. No. 5,742,445.

BACKGROUND OF THE INVENTION

1. Field of the Invention

The present invention relates to a magnetic tape machine having an automatic cartridge loader for carrying a cartridge recording medium.

2. Description of the Related Art

In recent years, an increase in storage capacity has been desired in association with an improvement in computer performance. For example, in a magnetic tape machine, it is strongly desired to make use of the characteristics of a cartridge recording medium (which will be hereinafter referred to also as a cartridge) as an exchangeable medium and to continuously process a plurality of cartridges. This desire is due to the fact that the use of the plurality of cartridges allows not only an improvement in storage and process capacity, but also a reduction of operator interaction, thereby contributing to a reduction in running cost.

An example known as the magnetic tape machine capable of processing a plurality of cartridges is a magnetic tape machine including a magnetic tape unit for performing read and write of data on each cartridge, a cartridge storing member having a plurality of cells capable of storing the plurality of cartridges, and an automatic cartridge loader for carrying each cartridge between each cell of the cartridge storing member and the magnetic tape unit. The automatic cartridge loader has, for example, an accessor movable in a direction of arrangement of the cells of the cartridge storing member. In general, robot control inclusive of a servo technique for controlling a moving speed of the accessor is performed by firmware. The firmware herein means hardware having computer programs and data unchangeable in user environment. In moving the accessor by a distance from one of the cells to another, the firmware calculates digital data of a current value to be applied to a motor for driving the accessor, and a DA converter then converts this digital data (DAC value) into an analog current value to thereby drive the accessor. A moving path of the accessor is composed of an acceleration region, a constant-speed region, and a deceleration region, for example.

In the conventional magnetic tape machine, the firmware is constructed under the condition that mechanical friction due to movement of the accessor is a constant value. Accordingly, if the shape of parts such as a shaft changes because of dust sticking to the parts, wearing, etc. during the operation of the machine, the firmware cannot cope with this problem to possibly cause errors. Further, a troublesome work is required in assembling the machine so that a constant friction value can be obtained.

SUMMARY OF THE INVENTION

It is therefore an object of the present invention to provide a magnetic tape machine which can suppress the occurrence of errors and requires no troublesome work for assembly.

In accordance with an aspect of the present invention, there is provided a magnetic tape machine comprising a magnetic tape unit for performing read and write of data on a cartridge recording medium; a cartridge storing member having a plurality of cells each capable of storing the cartridge recording medium; and an automatic cartridge Loader for carrying the cartridge recording medium between each cell of the cartridge storing member and the magnetic tape unit and between one of the cells and another of the cells of the cartridge storing member; the automatic cartridge loader comprising an accessor for holding the cartridge recording medium; moving means for supporting the accessor and moving the accessor in a direction of arrangement of the cells; and speed control means for controlling a moving speed of the accessor; the speed control means deciding the moving speed according to friction data between the accessor and the moving means.

In the magnetic tape machine according to the present invention, the speed control means measures friction due to movement of the accessor and decides the moving speed of the accessor according to a measured value of the friction. Accordingly, the problems in the prior art due to constant friction can be solved.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 21 is a view showing a part of a bit map in a work RAM;

DESCRIPTION OF THE PREFERRED EMBODIMENTS

A preferred embodiment of the present invention will now be described in detail with reference to the attached drawings.

Figure 1:
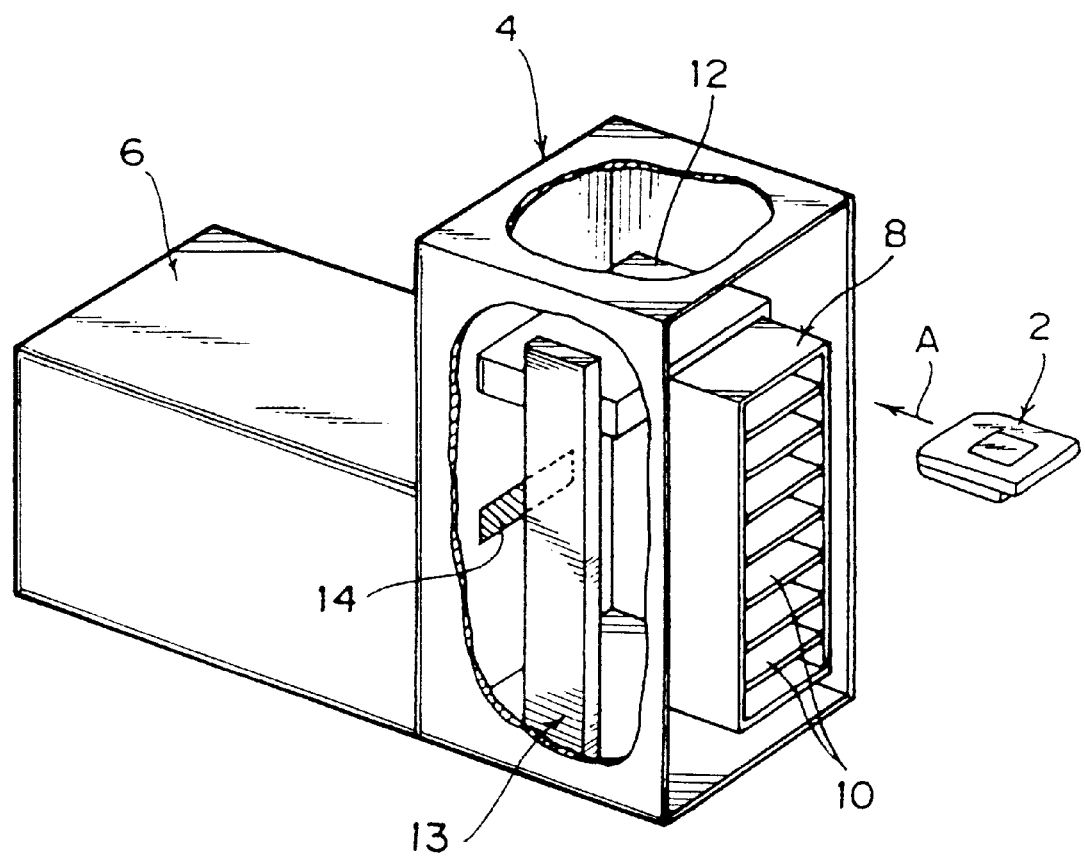
FIG. 1 is a partially cutaway, perspective view of a magnetic tape machine according to the present invention.

FIG. 1 is a cutaway perspective view of a magnetic tape machine to which the present invention is applicable. The magnetic tape machine shown in FIG. 1 includes an automatic exchanger mechanism 4 for a cartridge 2. A magnetic tape unit (MTU) 6 for performing read and write of data on the cartridge 2 is provided on the back side of the automatic exchanger mechanism 4. A cartridge storing member 8 capable of storing a plurality of cartridges 2 is provided in the automatic exchanger mechanism 4 on its front side. The cartridge storing member 8 has a plurality of shelves 10 vertically arranged, each allowing the cartridge 2 to pass toward the magnetic tape unit 6 in supplying the cartridge 2 in the direction shown by an arrow A in FIG. 1. Each shelf 10 will be referred to also as a cell.

An automatic cartridge loader 13 having an accessor 12 vertically movable in the direction of arrangement of the cells 10 is provided between the cartridge storing member 8 in the automatic exchanger mechanism 4 and the magnetic tape unit 6. The accessor 12 serves to extract the cartridge 2 from a selected one of the cells 10 of the cartridge storing member 8 and then insert it into a cartridge inlet/outlet hole 14 of the magnetic tape unit 6, and also serves to extract the cartridge 2 from the magnetic tape unit 6 and then return to the original cell 10 of the cartridge storing member 8.

Figure 2:
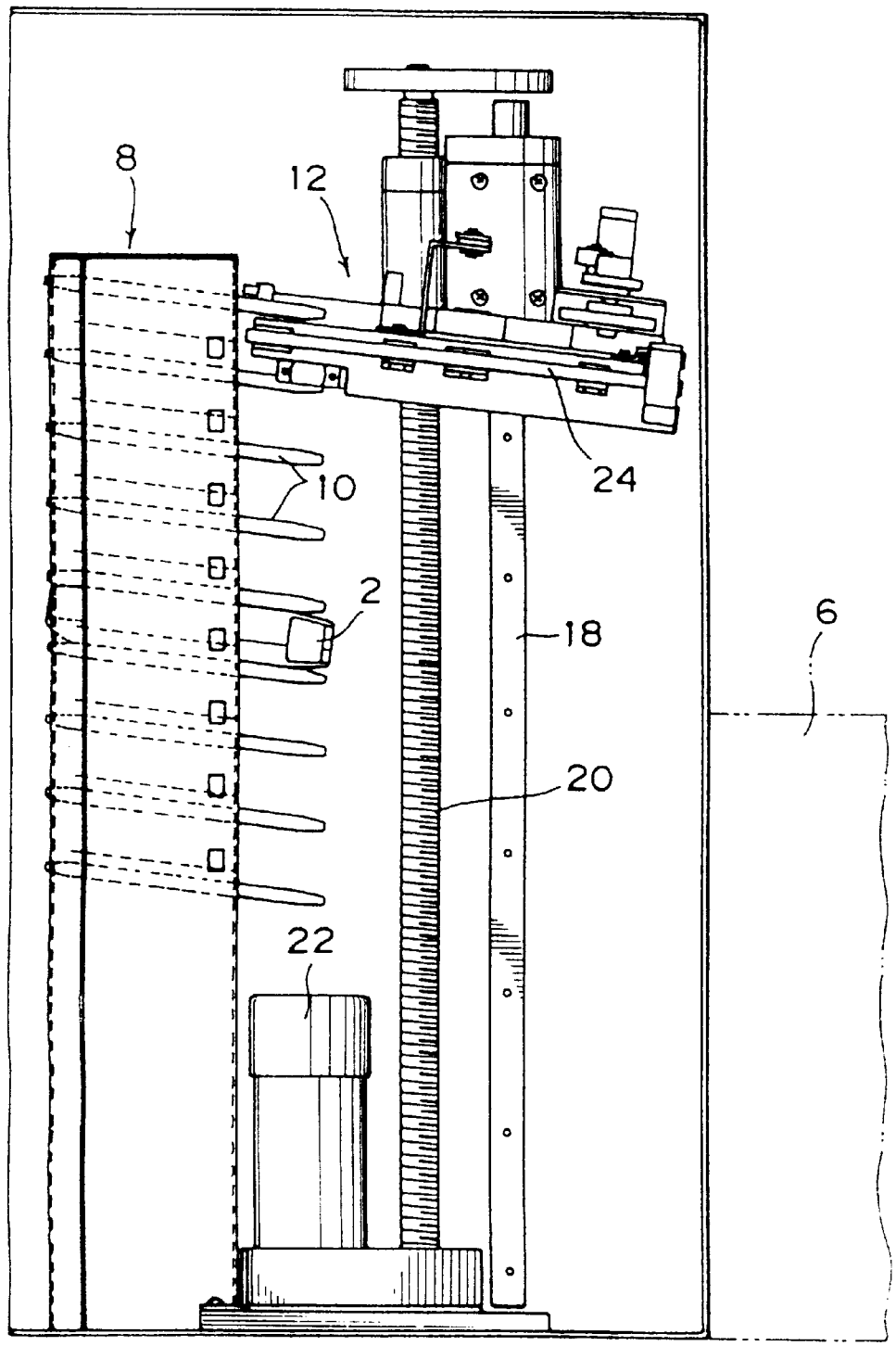
FIG. 2 is a right side view of an automatic cartridge exchanging mechanism in the magnetic tape machine shown in FIG. 1.

FIG. 2 is a right side view of the automatic exchanger mechanism 4 shown in FIG. 1. The accessor 12 is supported by a rail 18 and a string screw 20. The string screw 20 is threadedly engaged with the accessor 12. The string screw 20 is rotated by a motor 22, thereby vertically moving the accessor 12. The motor 22 is a servo motor with a tachocounter, for example, to execute a program for friction measurement to be hereinafter described.

All the cells 10 of the cartridge storing member 8 are inclined in parallel to each other so as to be lowered toward the inside of the machine. The accessor 12 is also inclined at the same angle of inclination of the cells 10. The reason why the cells 10 and the accessor 12 are inclined is to prevent the cartridges 2 stored in the cells 10 from falling out of the machine because of external shock etc. The accessor 12 has a pair of feeders 24 arranged so as to nip the cartridge 2. Each feeder 24 includes an endless belt and means for driving the endless belt. By driving the feeders 24 nipping the cartridge 2, the cartridge 2 can be fed from the cartridge storing member 8 to the magnetic tape unit 6 and vice versa.

Figure 3:
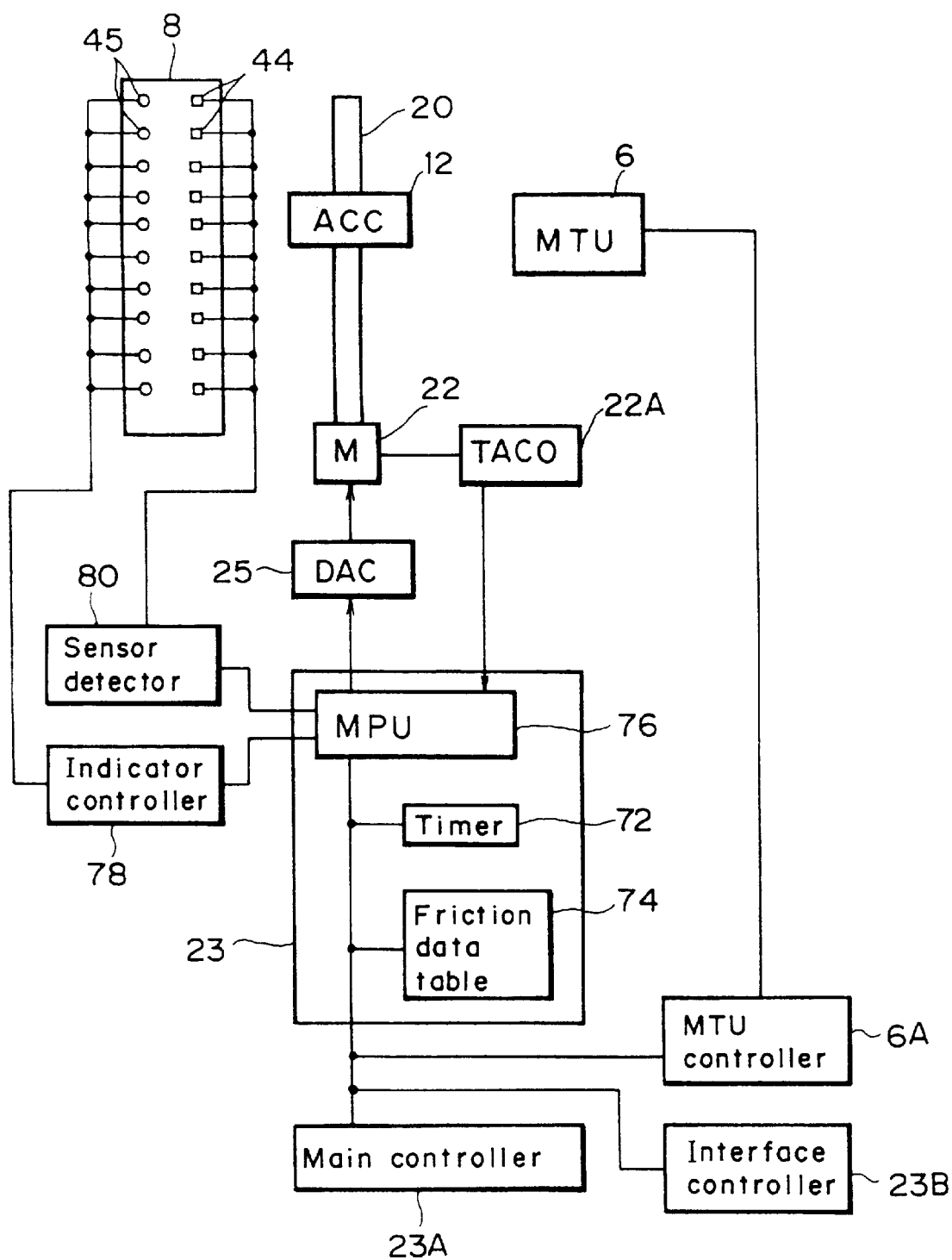
FIG. 3 is a block diagram of an automatic cartridge loader in the automatic cartridge exchanging mechanism shown in FIG. 2.

FIG. 3 is a block diagram showing hardware of the magnetic tape machine in the present invention. The hardware includes a main controller 23A for generally controlling the operation of the magnetic tape machine, an interface controller 23B for performing interface control to a host device, and an MTU controller 6A for controlling the operation of the MTU 6. The automatic cartridge loader 13 includes the accessor 12 movable in the direction of arrangement of the cells 10 of the cartridge storing member 8, and speed control means for controlling a moving speed of the accessor 12. In this preferred embodiment, the speed control means measures friction data due to movement of the accessor 12 and decides a moving speed of the accessor 12 according to a measured value of the friction data. More specifically, the speed control means includes the string screw 20 threadedly engaged with the accessor 12, the servo motor 22 with a tachocounter 22A, for rotating the string screw 20, an automatic cartridge loader controller 23 for calculating digital data (DAC value) of a current value to be applied to the servo motor 22 according to a count value from the tachocounter 22A, and a DA converter 25 for converting the DAC value to an analog current value and applying the analog current to the servo motor 22.

The automatic cartridge loader controller 23 has a timer 72 for measuring a moving speed of the accessor 12, a friction data table 74 for obtaining friction data corresponding to the measured speed, and an MPU 76 for performing various operations in accordance with predetermined programs. An indicator controller 78 and a sensor detector 80 are connected to the MPU 76. The indicator controller 78 is connected to a plurality of LEDs 45 for indication provided corresponding to all the cells 10 of the cartridge storing member 8. The sensor detector 80 is similarly connected to a plurality of sensors 44 provided corresponding to all the cells 10 of the cartridge storing member 8. Each sensor 44 serves to detect whether or not the cartridge 2 stored in the corresponding cell 10 has been processed. The details of the operation of the sensors 44 and the LEDs 45 will be hereinafter described.

Figure 4:
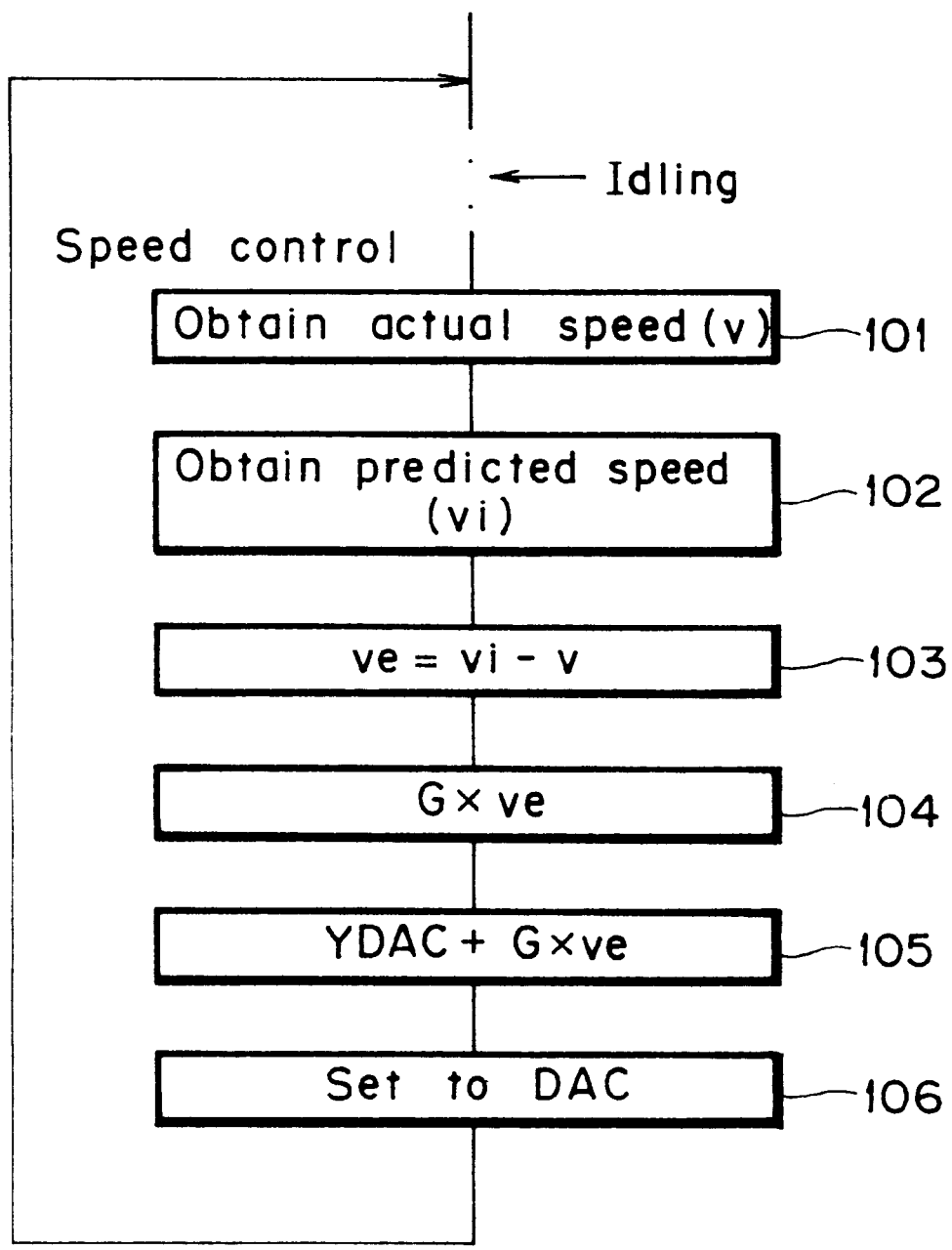
FIG. 4 is a flowchart of speed control of an accessor in the prior art.

FIG. 4 is a flowchart of speed control in the prior art. In the prior art, friction data is not reflected on the control of a moving speed of the accessor 12, that is, the control of the servo motor 22. More specifically, in step 101, a present actual speed v is obtained according to the number of tachopulses measured by the tachocounter 22A. In step 102, a predicted speed vi as a predicted number of tachopulses to be generated is obtained. In step 103, a difference between the predicted speed vi and the actual speed v is obtained (ve=vi−v). In step 104, the above difference ve is multiplied by a gain G to obtain a correction value (G×ve) of a DAC value, so as to approach the predicted speed. In step 105, the correction value (G×ve) and a DAC value (YDAC) necessary for the next predicted speed (v(i+1)) are added together (YDAC+G×ve). In step 106, the value obtained In step 105 is set in the DA converter 25.

In the prior art as mentioned above, the gain used in firmware is constant, and the gain is multiplied by the difference between the predicted speed and the actual speed. Then, the product of the gain and the difference is used as an error amount for feedback control. However, a proper gain amount at every position in a moving path of the accessor 12 varies. Accordingly, the control using the constant gain in the prior art sometimes undergoes oscillation. To the contrary, according to the preferred embodiment, friction data due to movement of the accessor 12 is detected, and a moving speed of the accessor 12 is decided according to the detected friction data. A method for detecting friction data will now be described.

Figure 5:
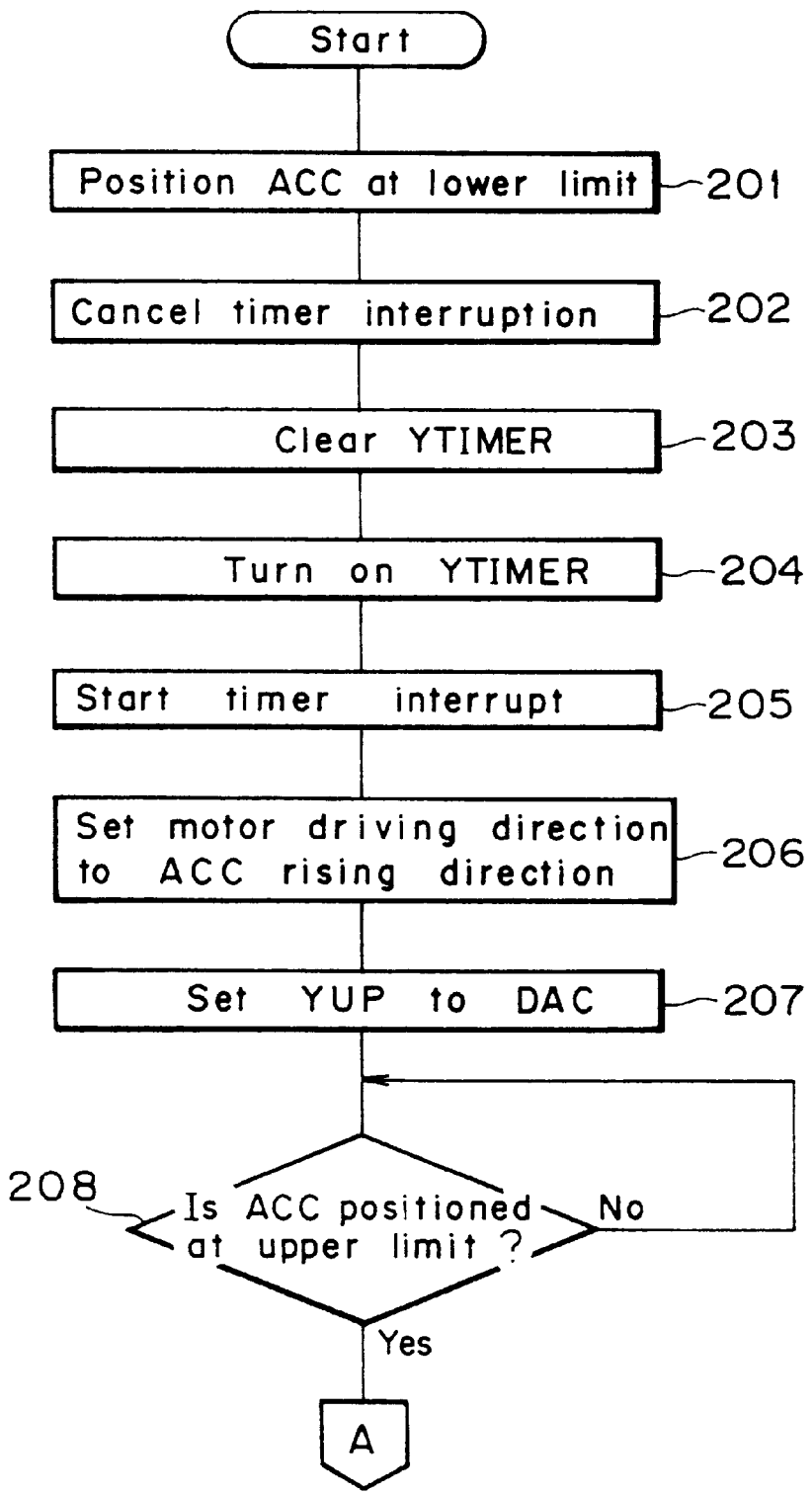
FIGS. 5 and 6 are flowcharts of friction data detection according to the present invention.
Figure 6:
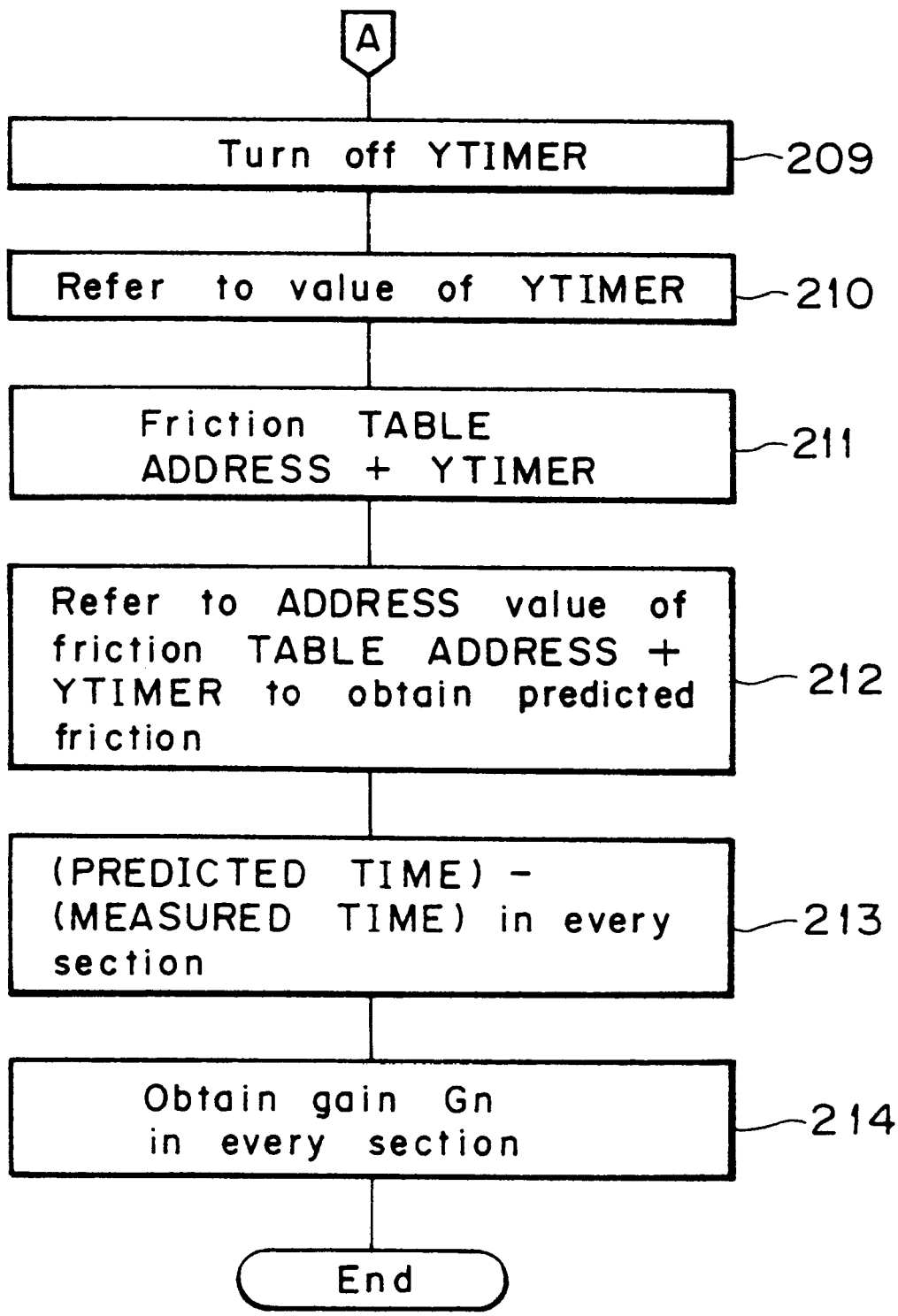
Figure 7:
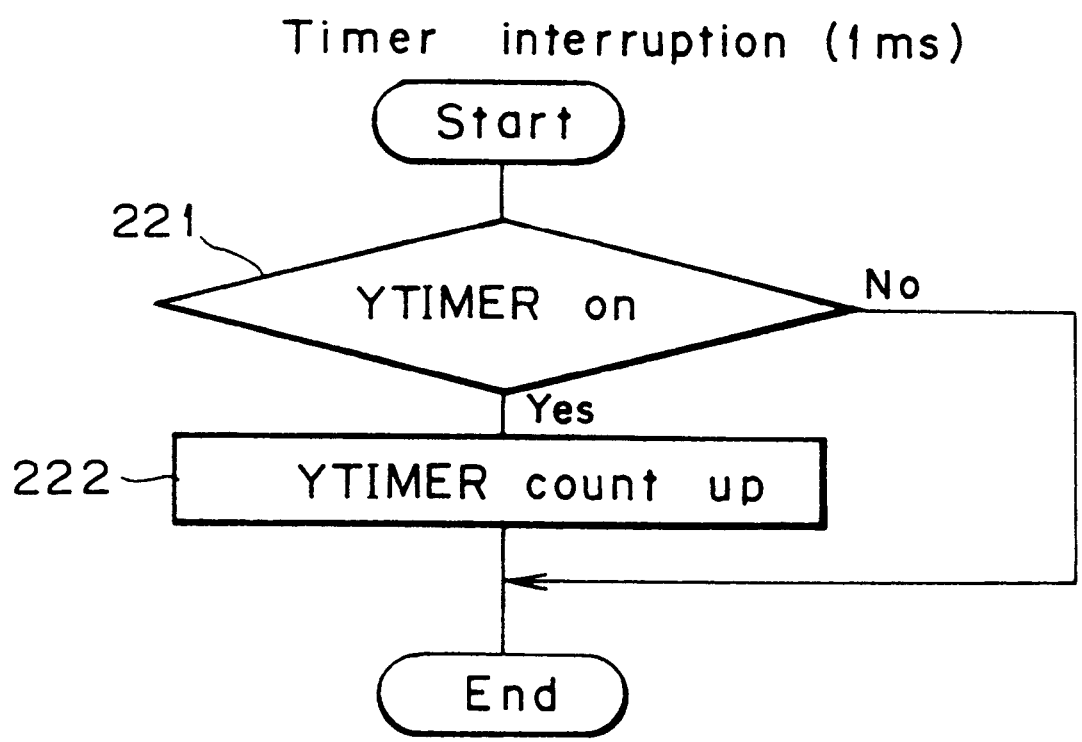
FIG. 7 is a flowchart of timer interruption according to the present invention.

FIGS. 5 and 6 are flowcharts of friction data detection in this preferred embodiment. This routine shown in FIGS. 5 and 6 is called when power is applied to the machine or when error is detected during speed control in vertical movement of the accessor 12. In this preferred embodiment, friction data is detected by measuring time required to move the accessor 12 by a predetermined distance by driving the servo motor 22 with a constant current, and obtaining friction data corresponding to the time measured above. To measure the time, the automatic cartridge loader controller 23 has a timer or a counter. In step 201, the accessor 12 is positioned at a lower limit or a lowermost position in an actual moving range. In this preferred embodiment, the timer mentioned above is realized by executing a program incorporated in the automatic cartridge loader controller 23. A count value of this timer interruption or this timer itself will be hereinafter referred to as "YTIMER". The timer interruption is executed at intervals of 1 ms, for example. A specific embodiment of this timer interruption is shown in FIG. 7. When the timer interruption is executed, it is determined whether or not YTIMER is on in step 221. If YTIMER is on, the program proceeds to step 222, in which YTIMER is counted up. If YTIMER is off, this routine shown in FIG. 7 is ended.

Referring again to FIG. 5, the flow subsequent to step 201 will be described. In step 202, the timer interruption is canceled, and in step 203, YTIMER is cleared. Then, in step 204, YTIMER is turned on, and in step 205, the timer interruption is started. In step 206, the driving direction of she servo motor 22 is set to a direction of rising the accessor 12. Then, in step 207, a constant value YUP is set as the DAC value, so as to supply a constant current to the servo motor 22. In step 208, it is determined whether or not the accessor 12 has been moved to an upper limit (or an uppermost position in the actual moving range). This determination of step 208 is continued until the accessor 12 reaches the upper limit. While step 208 is continued, the timer interruption shown in FIG. 7 is sequentially executed.

If the accessor 12 has reached the upper limit, the program proceeds to step 209, in which YTIMER is turned off. Then, in step 210, a value of YTIMER is referred to, and in step 211, YTIMER is added to an address in a friction data table. The friction data table is a table showing the relation between moving time and friction data created by using friction data actually measured with various machines. The friction data table is incorporated in the automatic cartridge loader controller 23. In step 212, an address value obtained in step 211 is referred to, and friction data ($\mu$) is obtained. In step 213, a difference between predicted time and measured time in every section of the moving range is obtained, and in step 214, a gain Gn in every section is obtained.

More specifically, the gain Gn in every section is obtained in steps 213 and 214 by the following method. In moving the accessor 12 by low-current drive, the moving path of the accessor 12 is divided into a suitable number of sections (Y0 to Yn), and friction data ($\mu 0$ to $\mu n$) in all sections are predicted. Then, gains (G0 to Gn) are decided in consideration of differences ($\mu-\mu 0$ to $\mu-\mu n$) between the friction data ($\mu 0$ to $\mu n$) and the friction data ($\mu$) to be finally obtained. The gains (G0 to Gn) are given by the following expressions.

$$G0 = G + K \times (\mu - \mu 0)$$

$$Gn = G + K \times (\mu - \mu n)$$

Where G denotes a gain for the friction data, and K denotes a coefficient relating to the differences between ($\mu 0$ to $\mu n$) and $\mu$.

The gains (G0 to Gn) thus obtained are incorporated into the firmware (the automatic cartridge loader controller). Then, the gain G0 is used to perform speed control in moving the accessor 12 in the section Y0. Similarly, the gain Gn is subsequently used to perform speed control in moving the accessor 12 in the section Yn.

Figure 8:
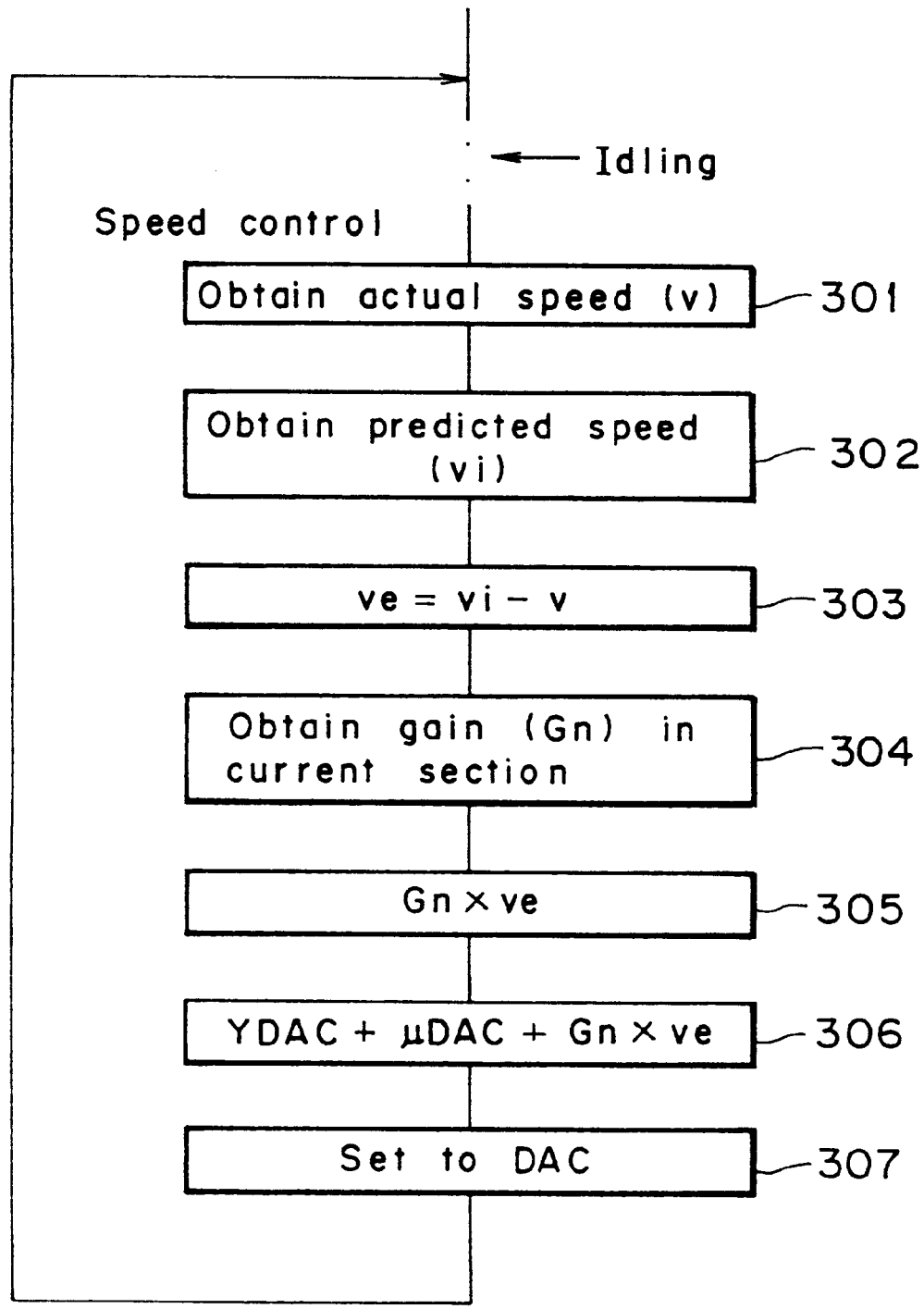
FIG. 8 is a flowchart of speed control of an accessor according to the present invention.

FIG. 8 is a flowchart of speed control on which the friction data is reflected according to this preferred embodiment. Steps 301 to 303 for obtaining a difference (ve=vi−v) between a predicted speed (vi) and an actual speed (v) are similar to steps 101 to 103 shown in FIG. 4. Then, in step 304, a gain Gn in a section where the accessor 12 is currently positioned is obtained. In step 305, the product of the gain Gn and the speed error ve is obtained (Gn×ve). In step 306, the sum of the value (Gn×ve) obtained in step 305, a DAC value (YDAC) necessary for obtaining the next predicted speed, and a DAC value ($\mu$DAC) for canceling the friction data $\mu$ is obtained (YDAC+$\mu$DAC+Gn×ve). In step 307, the value obtained in step 306 is set in the DA converter 25.

According to this preferred embodiment, the speed control of the accessor 12 is performed by using the friction data suitable for each machine and using the gain suitable for each section. Therefore, the precision of a stop position in stopping the accessor 12 can be easily improved. Further, variations or the like in shape of parts in the machine under any circumstances can be absorbed by the firmware. Accordingly, labor saving in assembling the machine can be expected to attain a cost reduction of the machine.

Figure 9:
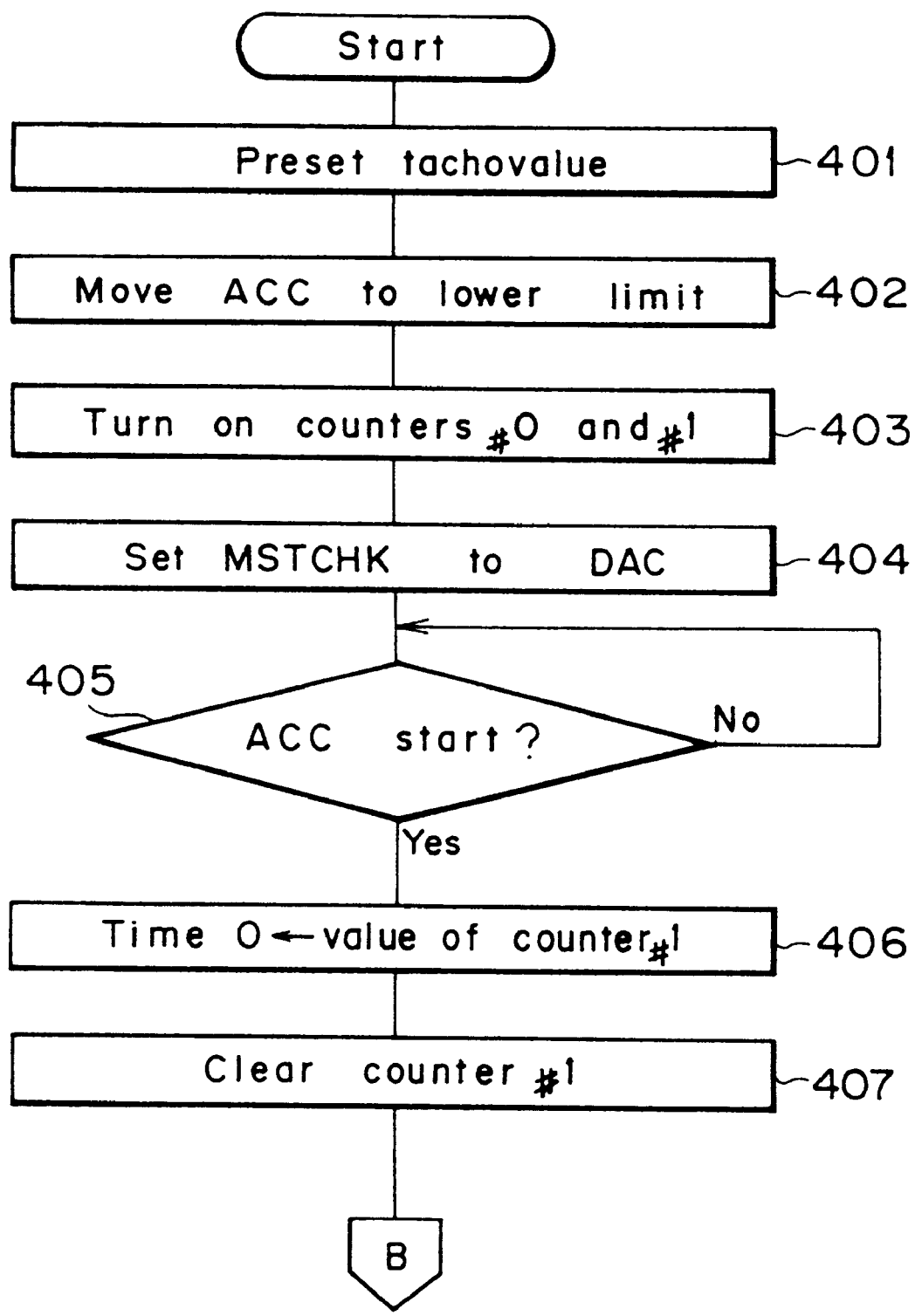
FIGS. 9 and 10 are flowcharts showing a specific embodiment of the friction data detection according to the present invention.
Figure 10:
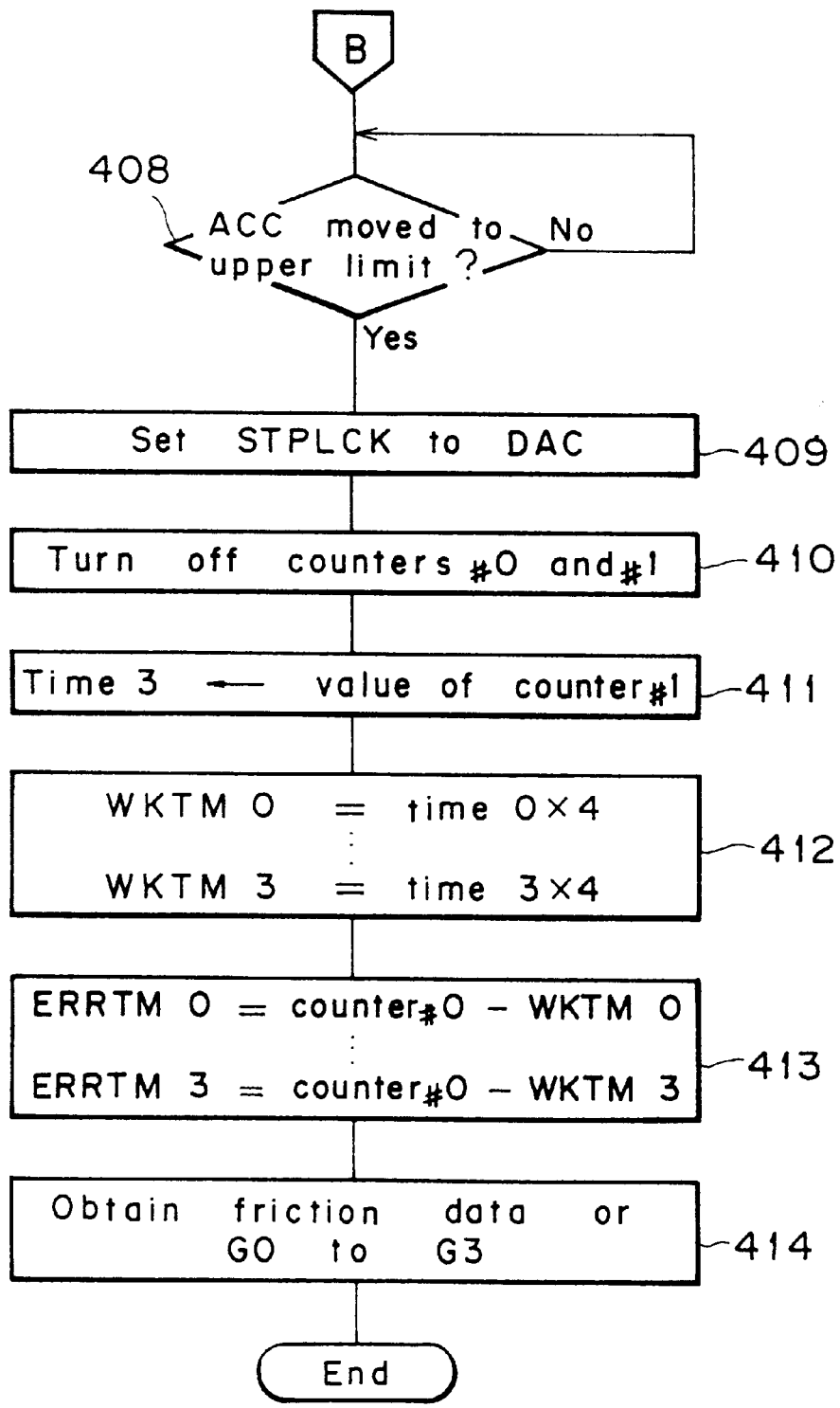

FIGS. 9 and 10 are flowcharts showing a specific embodiment of the friction data detection. In step 401, when power is applied to the machine, a tachovalue of the accessor 12 is preset to be decided. In step 402, the accessor 12 is moved to the lower limit. In the case that the friction data is obtained without dividing the moving path of the accessor 12 into a plurality of sections, the following process is executed; however, a flowchart of this process is not shown. When the accessor 12 is moved to the lower limit, a counter #0 for measuring time is turned on. The counter #0 is incremented at every interruption of 1 ms. Then, a DAC value (MSTCHK) for friction check is set in the DA converter 25, and the accessor 12 is moved to the upper limit. When the accessor 12 reaches the upper limit, a DAC value (STPLCK) for stop lock is set in the DA converter 25, and the counter #0 is turned off. Then, an address in the friction data table (MSTTBL) is set in a DPTR of the firmware, and a high-order one byte of measured time is set in an accumulator (A). Then, an address value of DPTR+A is called to the accumulator (A). This called value represents predicted friction, so that this value is later used as friction data.

In the case where the moving path of the accessor 12 is divided into a plurality of sections and the friction data is obtained in each section, the following process is executed. The moving path of the accessor 12 ranging from the lower limit to the upper limit is divided into n sections. In this specific embodiment, the moving path is divided into four sections, for example. At the time the counter #0 is turned on, a counter #1 is also simultaneously turned on (step 403). The counter #1 is also incremented at every interruption of 1 ms as similar to the counter #0. Then, in step 404, MSTCHK is set in the DA converter 25. The four sections are allocated to a section #0 between the lower limit and START1, a section #1 between START1 and START2, a section #2 between START2 and START3, and a section #3 between START3 and the upper limit. At the time the accessor 12 has passed START1 (step 405), a value of the counter #1 is written to TIME0 in a work RAM (step 406), and the value of he counter #1 is then cleared (step 407). As similar to steps 405 to 407, at the time the accessor 12 has passed START2, a value of the counter #1 is written to TIME1 in the work RAM, and the value of the counter #1 is then cleared. Subsequently, TIME2 and TIME3 are similarly obtained steps 408 to 411).

In step 412, TIME0 TO TIME3 are multiplied by four (in the case of n sections, TIME0 to TIMEn are multiplied by n) to obtain WKTM0 to WKTM3. In step 413, differences between the value of the counter #0 and WKTM0 to WKTM3 are obtained, and absolute values of these differences, ERRTM0 to ERRTM3 are obtained. Then, an address in a gain table (GNTBL) is set in DPTR, and ERRTM0 to ERRTM3 are set in the accumulator (A). Then, address values of DPTR+A are inserted into the accumulator (A) to obtain values of friction data or gains G0 to Gn in all sections (step 414).

According to this preferred embodiment as mentioned above, changes in shape of parts due to the use duration and the use environment and mechanical variations in assembling the machine are taken in as friction data by the firmware, thereby facilitating the control suitable for every machine. As a result, power saving in assembling the machine can be expected to attain a cost reduction of the machine. Further, fuzzy control is allowed.

The magnetic tape machine of the present invention employs various novel techniques to be hereinafter described.

(1) Control of recognition of cartridge conditions by the accessor (2) Control in returning the cartridge from the accessor to the cell (3) Use of a common power supply for the magnetic tape unit and the automatic cartridge loader (4) Control in connecting a library device to the magnetic tape machine These novel techniques may be applied to the magnetic tape machine in combination with each other or in combination with the friction data detection control mentioned above. Alternatively, any one of the novel techniques may be independently applied to the magnetic tape machine.

(1) Control of recognition of cartridge conditions by the accessor

As automation proceeds, the operability of the machine is increasingly simplified. Accordingly, it is desirable for the firmware to always recognize the conditions of the cartridges stored in the cells without operation. Further, it is also desirable for the firmware to recognize when an operator must exchange the cartridges and which of the plural cartridges the operator must exchange without operation.

Conventionally, all cells are provided with detection mechanisms for checking whether or not the cartridges are stored in the cells and checking whether the cartridge has been charged into or discharged from the machine. Further, a method for detecting a cleaning cartridge is usually realized by recognizing the cleaning cartridge just after loading it into the magnetic tape unit, by recognizing it by operation such as switch operation by the operator, or by recognizing it by the use of a special sensor for detecting the cleaning cartridge. Further, in connecting the magnetic tape machine to a library device, automatic cleaning is dependent upon an interface in the library device, and is not independently carried out by the magnetic tape machine. Now, a preferred embodiment for solving these problems will be described.

Figure 11:
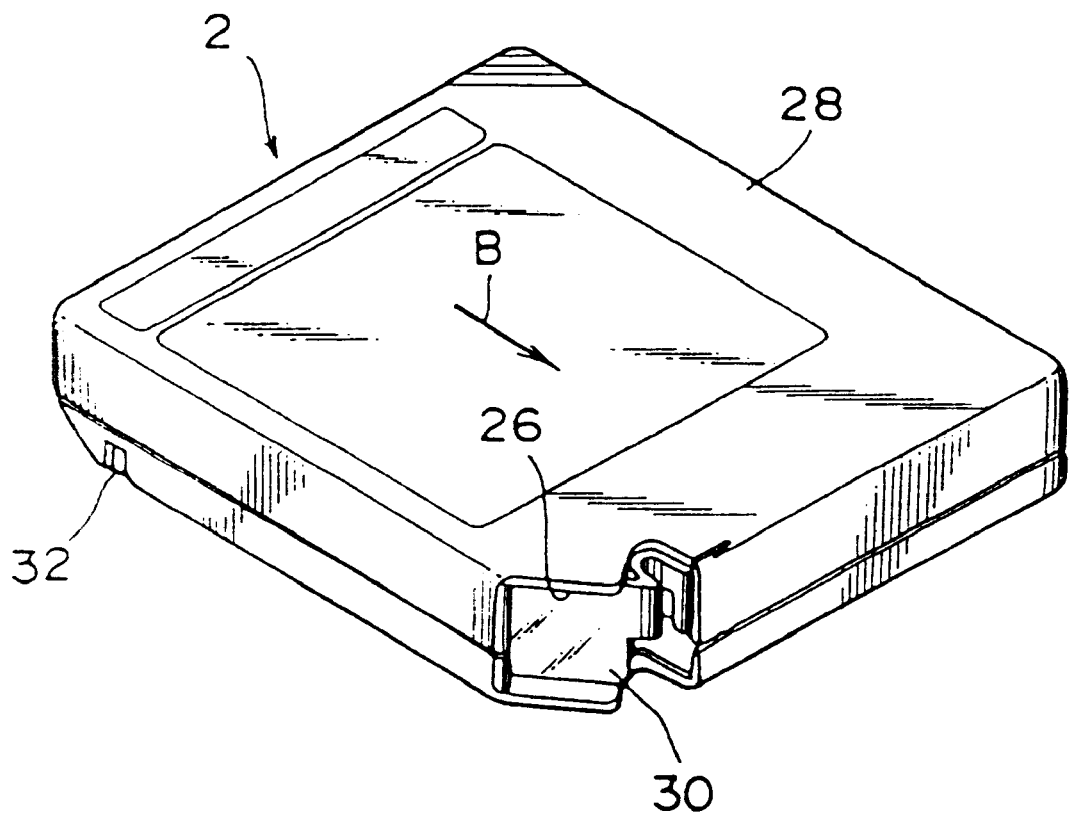
FIG. 11 is a perspective view of a cartridge used in the present invention.

As shown in FIG. 11, the cartridge (data cartridge) 2 is composed of a substantially rectangular cartridge case 28 having a cutout 26 at one of the four corners, a wrapped magnetic tape stored in the cartridge case 28, and a leader block 30 fixed to one end of the magnetic tape and designed to be fitted in the cutout 26 when the magnetic tape is wound up in the cartridge case 28. The arrow B marked on the upper surface of the cartridge case 28 shows a direction of insertion of the cartridge 2 into the magnetic tape unit. Further, a pair of notches 32 for a latch mechanism to be hereinafter described are formed on the opposite side surfaces of a lower portion of the cartridge case 28 at its rear end portion in respect of the insert direction of the cartridge 2.

Figure 12A:
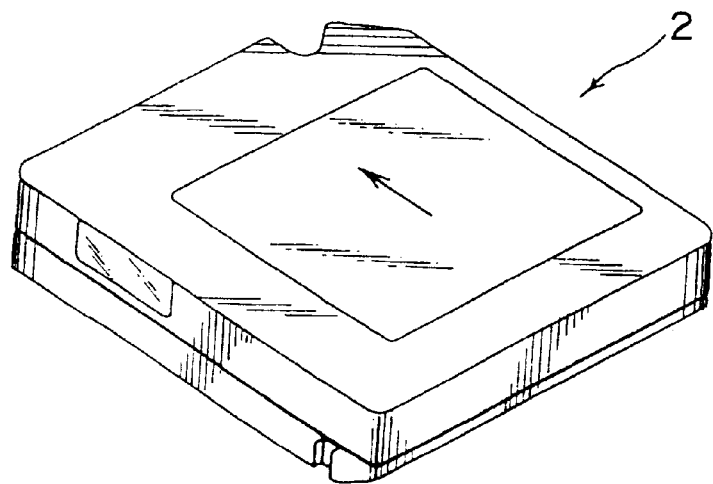
FIGS. 12A and 12B are perspective views of a usual data cartridge and a cleaning cartridge used in the present invention, respectively.
Figure 12B:
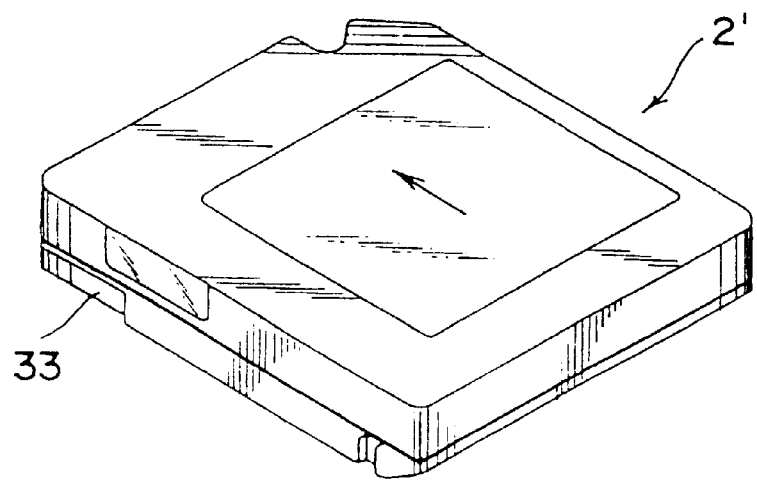

The difference in shape between a usual data cartridge 2 and a cleaning cartridge 2' will now be described with reference to FIGS. 12A and 12B. FIG. 12A is a perspective view of the data cartridge 2, which is a view from the rear side of the cartridge shown in FIG. 11. FIG. 12B is a perspective view of the cleaning cartridge 2' as viewed in the same direction as that of FIG. 12A. As shown in FIGS. 12A and 12B, the difference between the data cartridge 2 and the cleaning cartridge 2' is that a recess 33 is further formed on a left side surface of the cleaning cartridge 2' at its front end portion in respect of the insert direction of the cleaning cartridge 2'.

Figure 13:
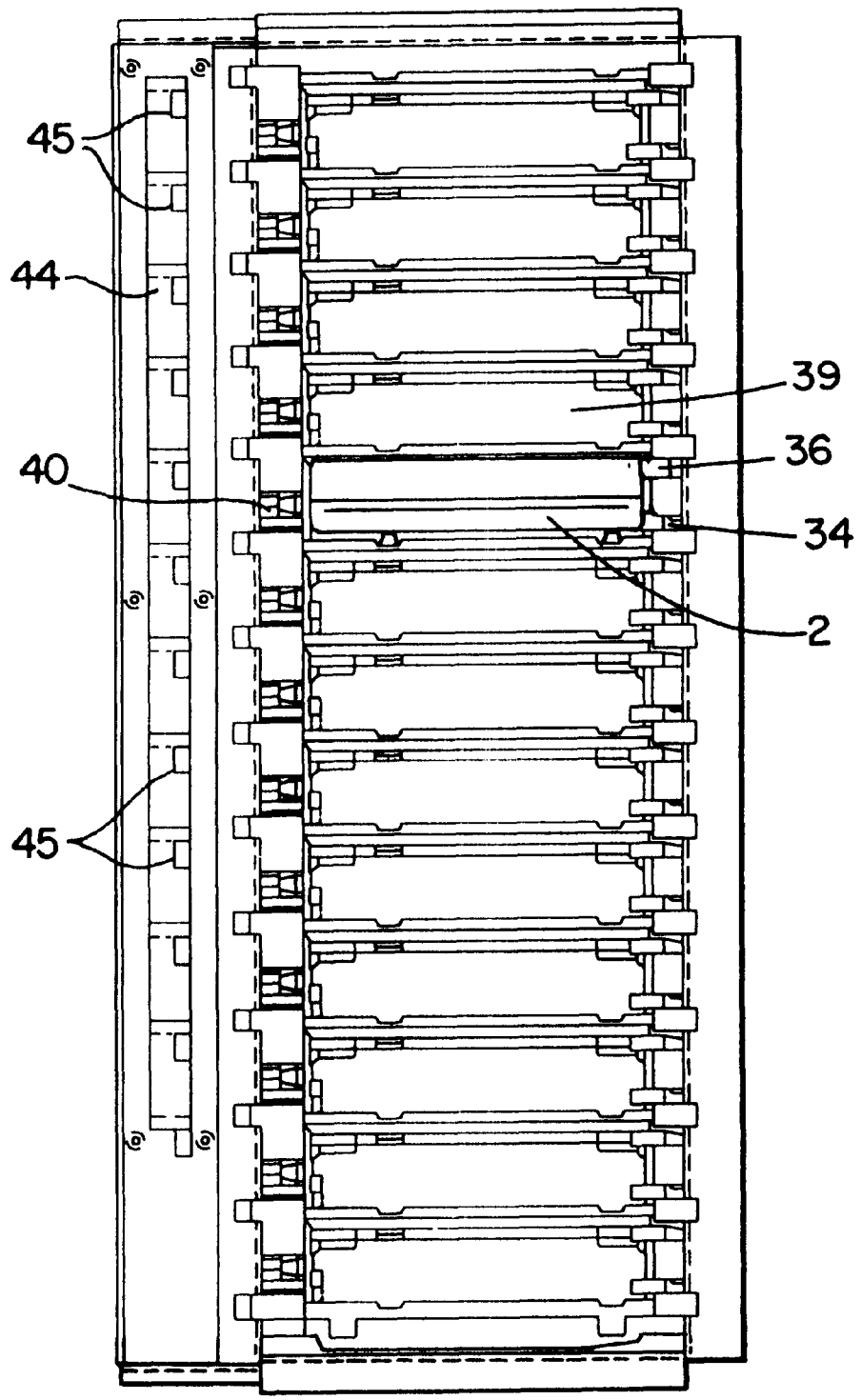
FIG. 13 is a front elevational view of a cartridge storing member in the magnetic tape machine shown in FIG. 1.
Figure 14:
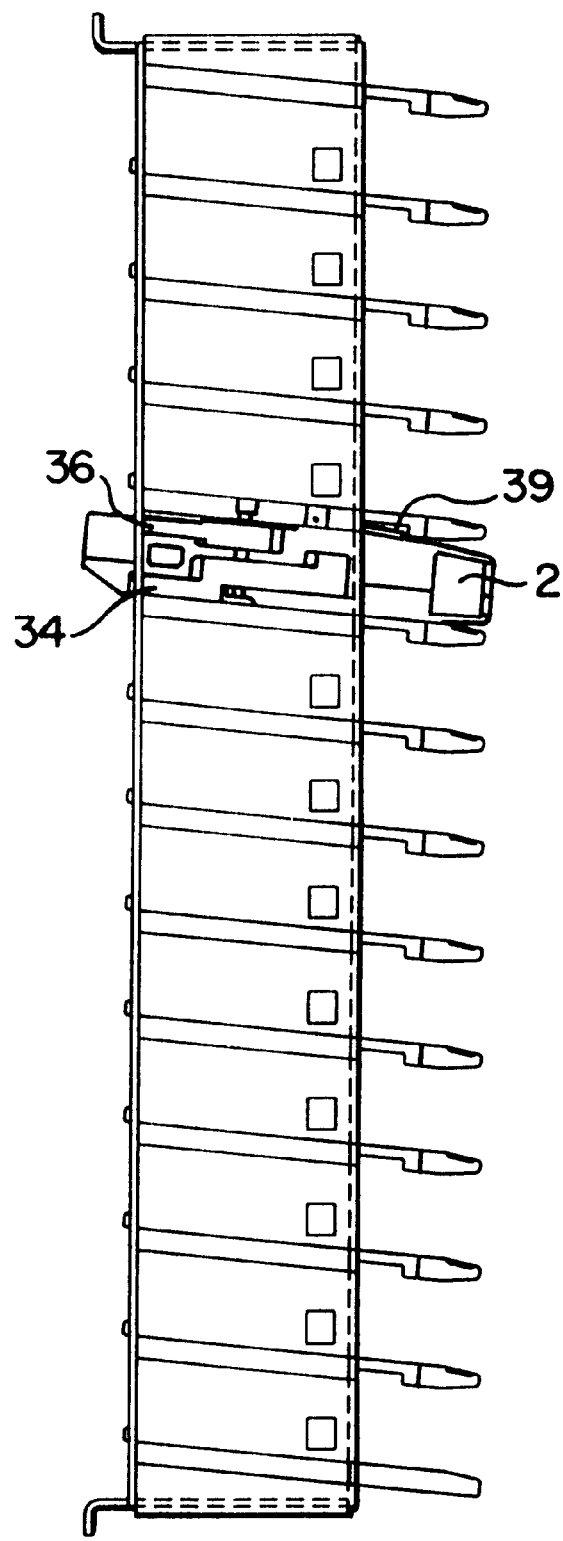
FIG. 14 is a right side view of the cartridge storing member shown in FIG. 13.
Figure 15:
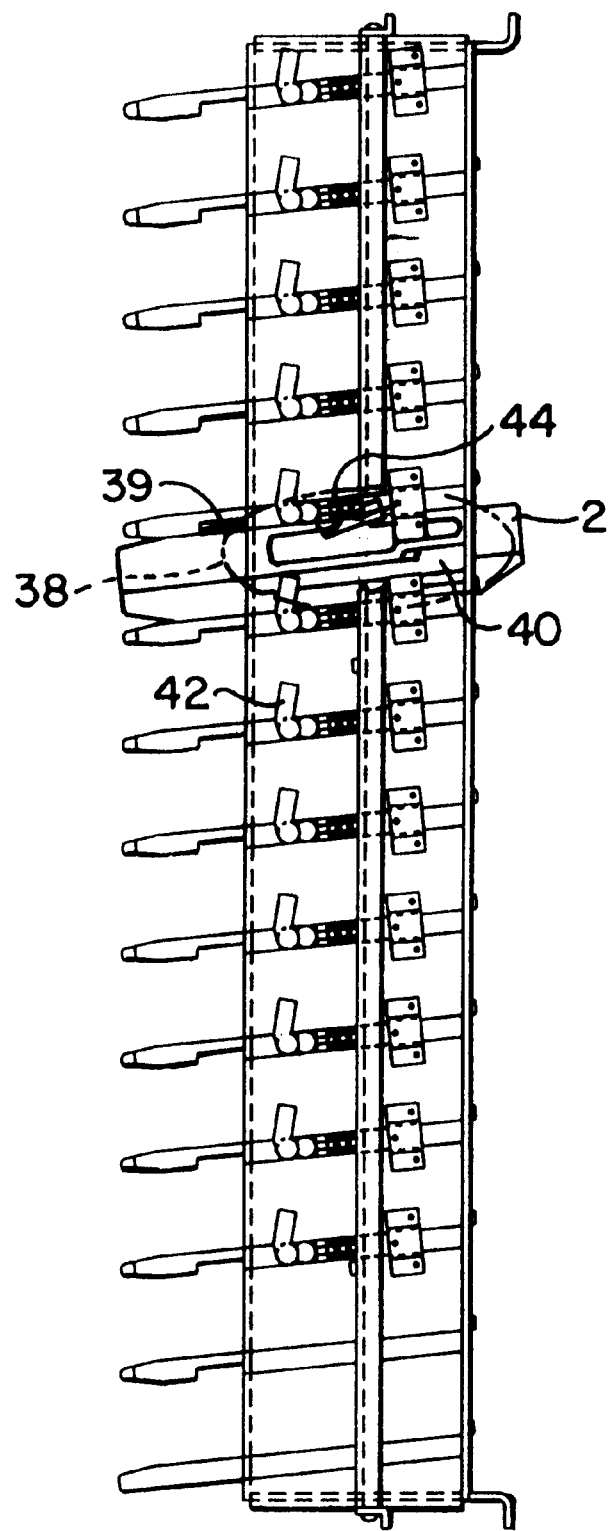
FIG. 15 is a left side view of the cartridge storing member shown in FIG. 13.
Figure 16A:
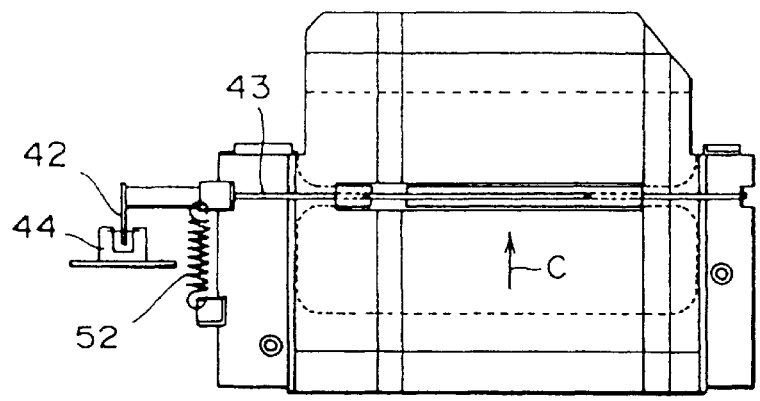
FIGS. 16A, 16B, and 16C are a top plan view, a front elevational view, and a bottom plan view, respectively, of each cell of the cartridge storing member shown in FIG. 13.
Figure 16B:
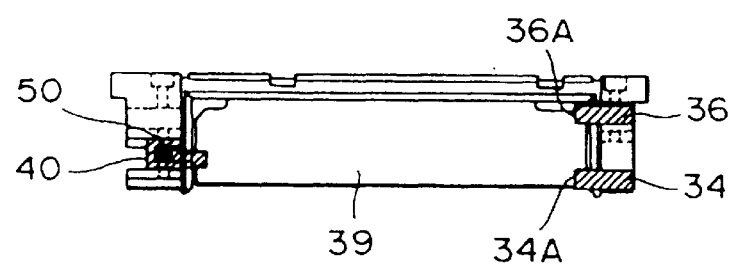
Figure 16C:
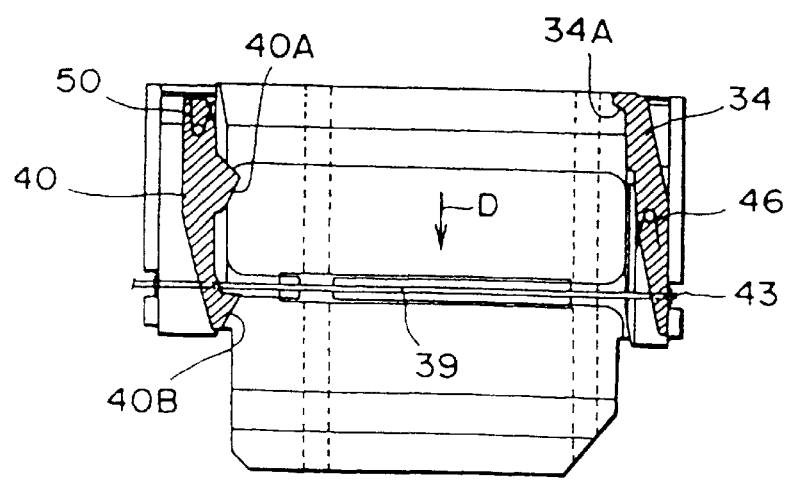
Figure 17A:
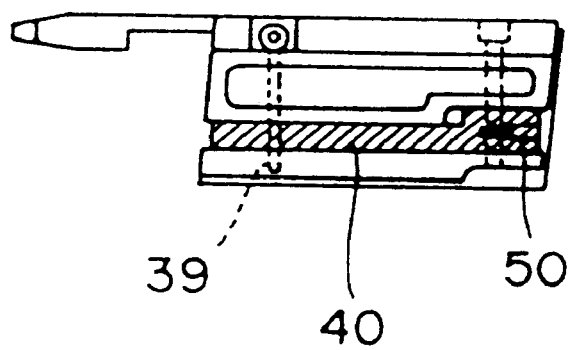
FIGS. 17A and 17B are a left side view and a right side view, respectively, of each cell shown in FIGS. 16A to 16C.
Figure 17B:
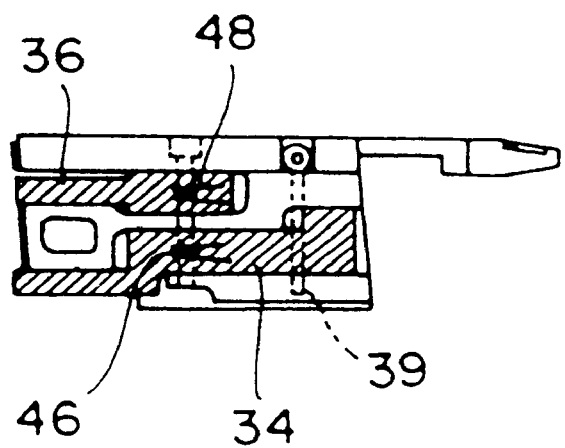

FIGS. 13, 14, and 15 are a front elevational view, a right side view, and a left side view of the cartridge storing member 8, respectively. FIG. 16A, 16B, and 16C are a top plan view, a front elevational view, and a bottom plan view of each cell 10, respectively. FIGS. 17A and 17B are a left side view and a right side view of each cell 10, respectively.

Each cell 10 of the cartridge storing member 8 has a latch mechanism 34 for latching the charged cartridge 2 at a position where the cartridge 2 is to be transferred to the accessor 12, an improper insertion preventing mechanism 36 for allowing insertion of the cartridge 2 only when the cartridge 2 has been charged in the proper orientation, and a safety mechanism (shutter mechanism) 38 including a door 39 designed to open only when charging and discharging the cartridge 2. The safety mechanism 38 further includes a stopper 40 for limiting the opening/closing operation of the door 39 in cooperation with pass of the cartridge 2, and a flag 42 for detecting whether the cartridge 2 has just been charged and not yet been processed or the cartridge 2 has already been processed and is to be discharged.

The door 39 is rotatably mounted on a rotatable shaft 43, and the flag 42 is fixed to one end of the rotatable shaft 43. Further, an optical sensor 44 is provided to detect the processed/unprocessed condition of the cartridge 2 according to a rotational position of the flag 42. In this preferred embodiment, the optical sensor 44 is a photointerrupter provided at a front end of the accessor 12 so as to pass a locus of rotation of the flag 42. The provision of the flag 42 and the sensor 44 allows determination of the processed condition or the unprocessed condition of the cartridge 2 in each cell 10 of the cartridge storing member 8 according to an output signal from the sensor 44. In this preferred embodiment, the result of determination is indicated to the operator by the LED 45 provided aside each cell 10 of the cartridge storing member 8.

Reference numerals 46, 48, and 50 denote torsion springs. The torsion springs 46, 48, and 50 normally bias the latch mechanism 34, the improper insertion preventing mechanism 36, and the stopper 40, respectively, toward the inside of each cell 10. These members 34, 36, and 40 are horizontally rotatable about vertical shafts on which the torsion springs 46, 48, and 50 are mounted. Reference numeral 52 denotes a coil spring extending between the flag 42 and the corresponding cell 10. The coil spring 52 normally bias the door 39 in its closing direction.

The arrow C shown in FIG. 16A and the arrow D shown in FIG. 16C denote a direction of insertion of the cartridge 2. In this preferred embodiment, the accessor 12 has various cartridge sensors such as a cartridge presence/absence sensor for detecting whether or not the cartridge is present in the cell 10. The cartridge sensors of the accessor 12 will be hereinafter described in detail.

Figure 18:
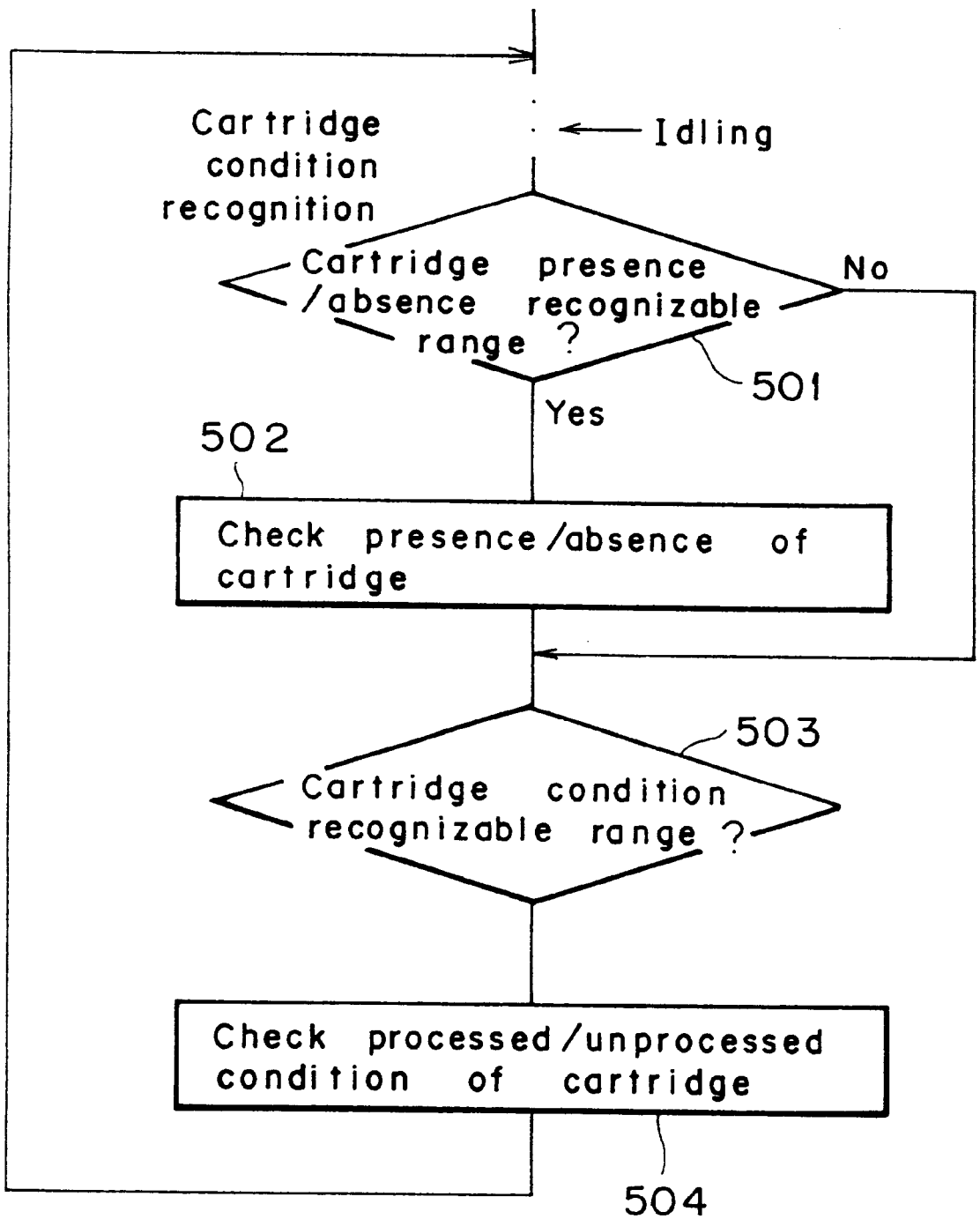
FIG. 18 is a flowchart of cartridge condition recognition control according to the present invention.

FIG. 18 is a flowchart showing the control of recognition of cartridge conditions. In step 501, it is determined whether or not the accessor 12 is positioned in the range where the presence/absence of the cartridge in each cell can be recognized. This determination is performed during vertical movement of the accessor 12, and for example, realized by determining whether or not a tachovalue from the tachocounter 22A (see FIG. 3) falls within a predetermined range. If the accessor 12 is positioned in this range, the program proceeds to step 502, in which the presence or absence of the cartridge in the cell is checked under speed control of the accessor 12. After checking the presence or absence of the cartridge in the cell, or if the accessor 12 is not positioned in the above range in step 501, the program proceeds to step 503, in which it is determined whether or not the accessor 12 is positioned in the range where the flag 42 can be detected. If the accessor 12 is positioned in this range, the program proceeds to step 504, in which he processed/unprocessed condition of the cartridge is checked. In this case, considering a delay of response of each sensor, the range of the tachovalue is preset so as to allow reliable detection of the presence or absence of the cartridge and reliable detection of the flag 42.

The kind of the cartridge can be recognized by detecting an upper portion and a lower portion of the cartridge and discriminating between the data cartridge and the cleaning cartridge from the difference in shape. That is, since he cleaning cartridge has a recess (at 33 shown in FIG. 12B) at the lower portion, the kind of the cartridge can be recognized. When the cleaning cartridge is detected, it is fed to the cell dedicated to the cleaning cartridge. If another cleaning cartridge has already been stored in the dedicated cell, the cleaning cartridge is not fed. In performing automatic cleaning, the cleaning cartridge can be detected by the firmware of the automatic cartridge loader, so that when it is confirmed hat a given number of cartridges have been fed to the magnetic tape unit, for example, the cleaning cartridge is fed to the magnetic tape unit to allow cleaning.

Figure 19:
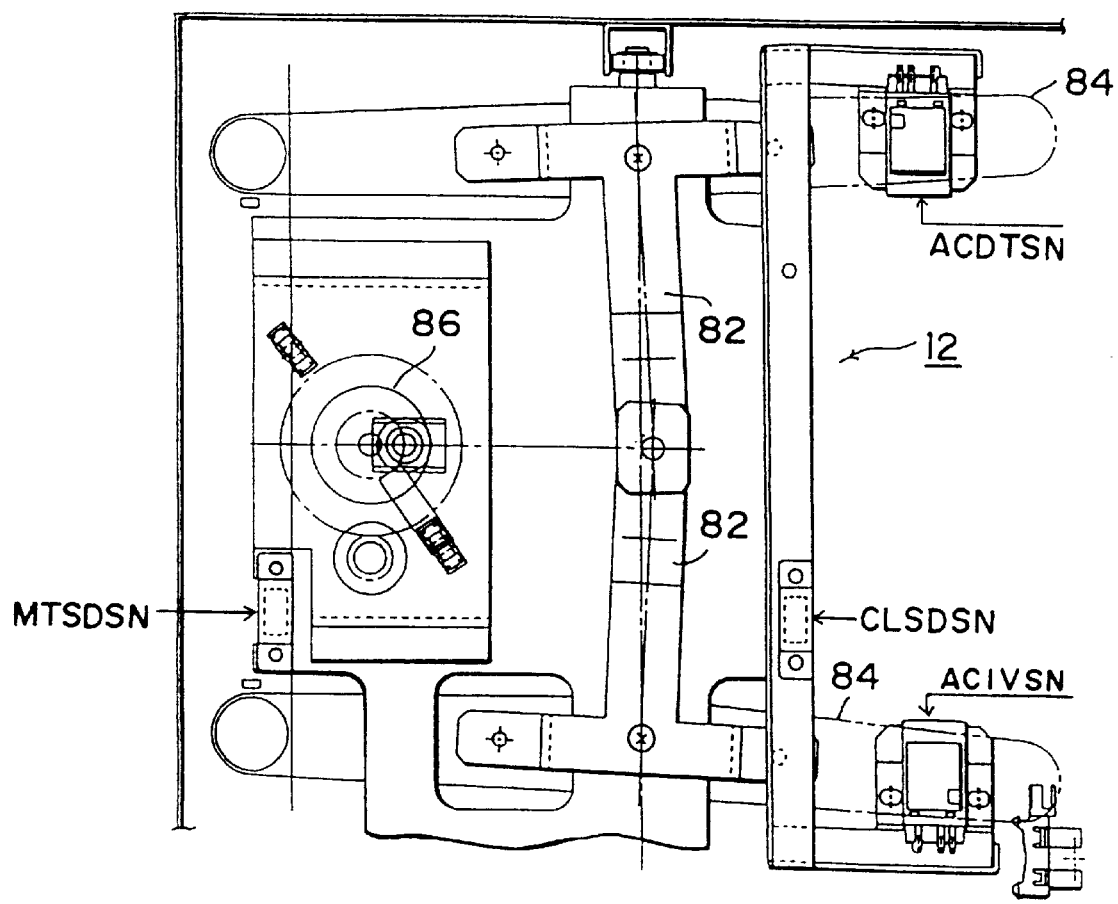
FIG. 19 is a plan view of the accessor.
Figure 20:
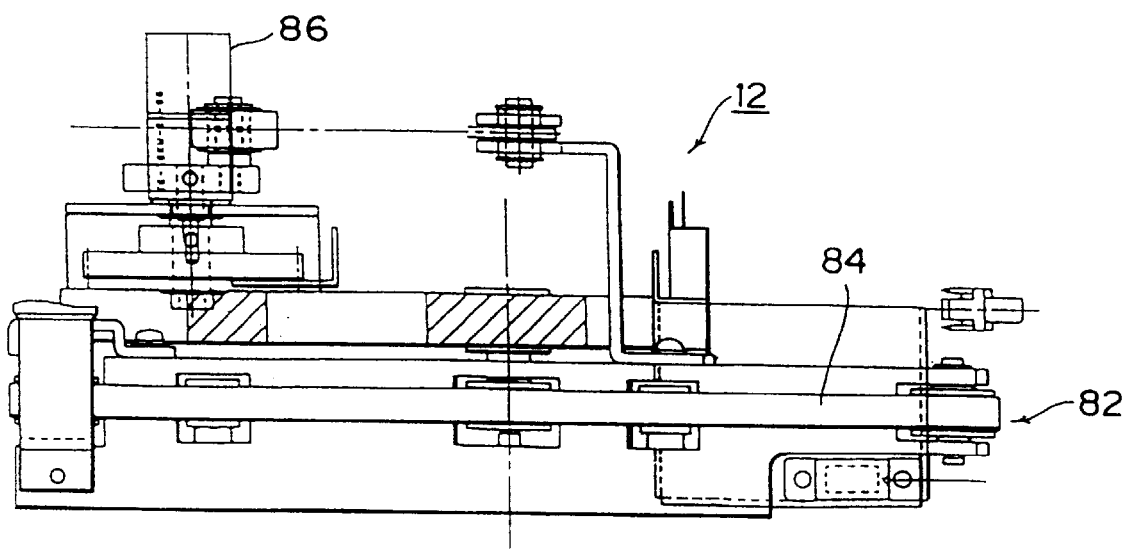
FIG. 20 is a side view of the accessor.

FIGS. 19 and 20 denote a plan view and a side view of the accessor 12. The arrangement of each sensor will now be described with reference to FIGS. 19 and 20. Reference numeral 82 denotes an actuator for performing a grip operation and a feed operation of the cartridge; reference numerals 84 denote a pair of feed belts provided on both sides of the actuator 82; and reference numeral 86 denotes a motor for driving the feed belts 84. The cartridge sensors of the accessor 12 include an MTU side sensor (MTSDSN) provided on the side of the magnetic tape unit, a cell side sensor (CLSDSN) provided on the side of each cell, a cartridge detect sensor (ACDTSN) as a cartridge presence/absence sensor provided at a catcher of the accessor 12, and a cartridge inverse sensor (ACIVSN) provided at the catcher of the accessor 12. Each sensor becomes on when detecting an object, and becomes off when not detecting the object. The accessor 12 further includes a cartridge condition sensor (CTGCND) for detecting the flag 42.

FIG. 21 is a view showing a part of a bit map stored in a work RAM used by the firmware of the automatic cartridge loader during control. In FIG. 21, CELL0 to CELLn show the presence/absence of the cartridges, and CLNG0 to CLNGn show the values by detecting the recess formed at the lower portion of the cleaning cartridge with ACDTSN. Further, CTG0 to CTGn show the processed/unprocessed condition of the cartridges.

When ACDTSN detects the upper portion of the cleaning cartridge, it becomes on, whereas ACDTSN detects the recess formed at the lower portion of the cleaning cartridge, it becomes off. The ranges where the cartridge presence/absence sensor of the accessor 12 can detect the cartridge, that is, can detect the data cartridge stored in each cell, are expressed as $DCTMIN0$ to $DCTMAX0$, ..., $DCTMINn$ to $DCTMAXn$. In considering the difference in shape between the data cartridge and the cleaning cartridge, $DCTCLN > DCTMIN$ holds.

Assuming that the accessor 12 is moved from the m-th cell to the n-th cell (m<n), the on/off state of ACDTSN at the m-th cell is first detected. If the on-state is detected, "1" is written to $CELLm$ in the work RAM, whereas if the off-state is detected, "2" is written to $CELLm$ in the work RAM. When the accessor 12 is positioned in the range of $DCTCLNm+1$ to $DCTMAXm+1$ during speed control, the value of ACDTSN is written to $CELLm+1$ in the work RAM. Thereafter, when the accessor 12 is positioned in the range of $DCTCLNm+2$ to $DCTMAXm+2$, the value of ACDTSN is written to $CELLm+2$ in the work RAM. Similarly, the value of ACD7-SN is written to $CELLn-1$. Finally, when the accessor 12 is stopped before the n-th cell, the value of ACDTSN is written to $CELLn$ in the work RAM. When the accessor 12 is stopped before the magnetic tape unit 6, the value of ACDTSN is not written into the work RAM. As similarly to the above operation, when the accessor 12 is positioned in the ranges of $DCTMINm+1$ to $DCTCLNm+1$, ..., n, the values of ACDTSN are written to $CLNGm+1$, ..., $CLNGn$.

If $CELLn$ is "1" and $CLNGn$ is "1", it is determined that the data cartridge is present in the n-th cell. If $CELLn$ is "1" and $CLGNn$ is "0", it is determined that the cleaning cartridge is present in the n-th cell. If $CELLn$ is "0" and $CLNGn$ is "0", it is determined that neither the data cartridge nor the cleaning cartridge is present in the n-th cell. When the cleaning cartridge is detected, it is fed to the cell dedicated to the cleaning cartridge. However, if another cleaning cartridge has already been stored in this dedicated cell, no operation is performed. When a given number of data cartridges have been fed into the magnetic tape unit 6 or errors have occurred many times in the magnetic tape unit 6, the cleaning cartridge stored in the dedicated cell is fed into the magnetic tape unit 6 to perform automatic cleaning.

Assuming that the ranges where CTGCND can detect the flag 42 is expressed as $CTGMIN0$ to $CTGMAX0$, ..., $CTGMINn$ to $CTGMAXn$, the processed/unprocessed conditions of the cartridge are written to $CTG0$ to $CTGn$ by a method similar to the above detecting method.

According to this preferred embodiment as mentioned above, the presence/absence of the cartridge in each cell can be simply recognized in real time by using the cartridge detect sensor of the accessor. Further, the processed/unprocessed condition of the cartridge in each cell can be easily recognized by using the cartridge condition sensor of the accessor. Accordingly, any special mechanism can be eliminated to thereby allow a reduction in size and cost of the machine.

(2) Control in returning the cartridge from the accessor to the cell

Before the cartridge processed is taken out of the magnetic tape machine by the operator, the cartridge must be ejected from the magnetic tape unit to the cell. Further, unless the cartridge is properly ejected to the cell, the cartridge in the cell may project to the operator side or to the magnetic tape unit side. For example, if the cartridge projects to the magnetic tape unit side, the accessor comes into collision with the cartridge curing vertical movement, causing a risk of breakage of the cartridge or the accessor. It is therefore desirable to detect that the cartridge has been properly returned to the cell. Further, the cleaning cartridge can be recognized by the firmware for controlling the automatic cartridge loader. Accordingly, in the case where a library device is connected to the magnetic tape machine, an interface between the library device and the magnetic tape machine can be eliminated, and hardware, software, cable, etc. associated with the interface can also be eliminated, thus providing an inexpensive system. Conventionally, a mechanism for detecting only that the cartridge has been returned to the cell is adopted, resulting in an increase in cost for this mechanism and a difficulty of reduction in size. This preferred embodiment utilizes the cartridge inverse sensor of the accessor to detect that the cartridge has been properly returned to the cell, thereby attaining a size reduction of the machine.

Figure 22:
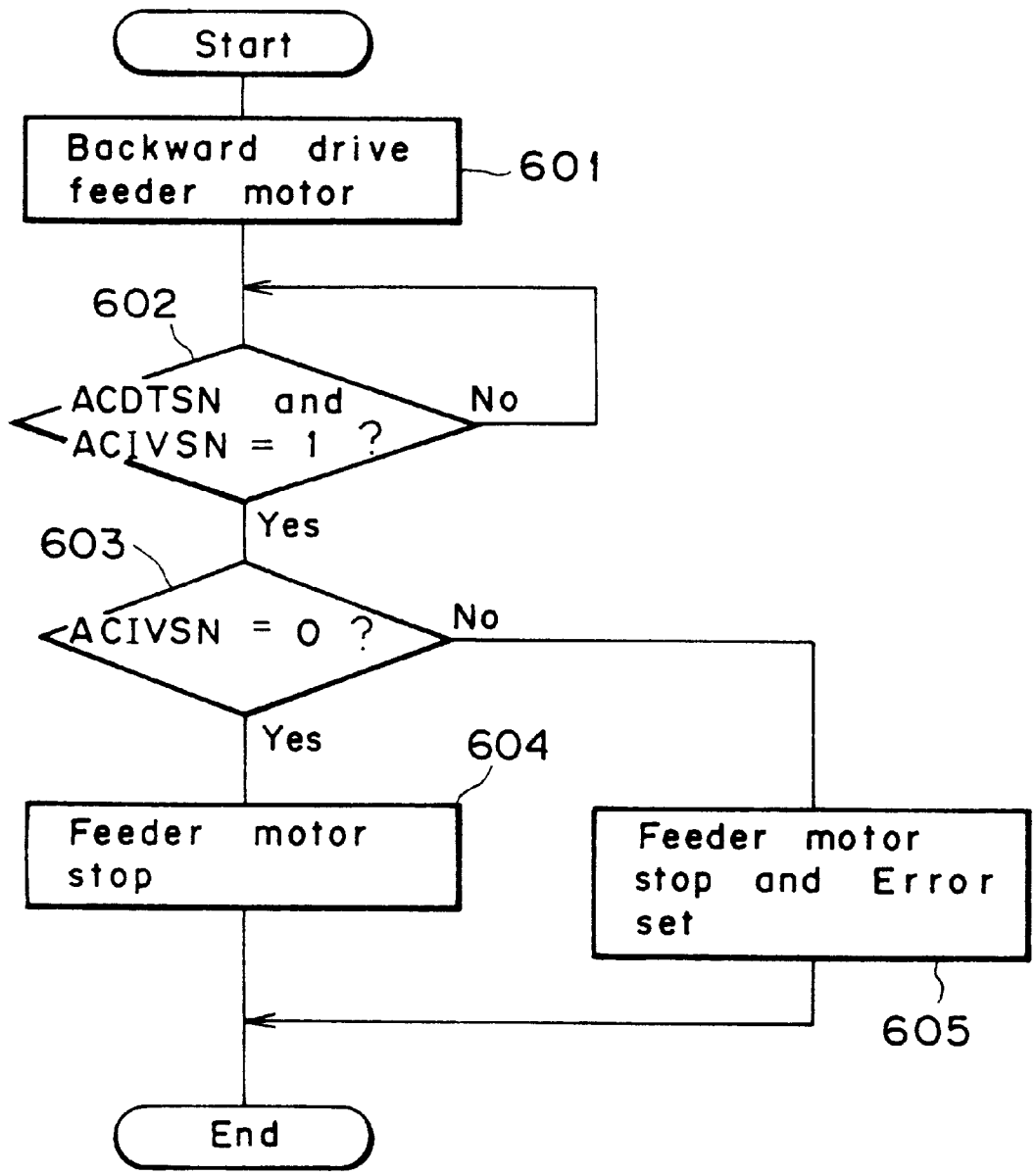
FIG. 22 is a flowchart in returning the cartridge from the accessor to each cell.
Figure 23:
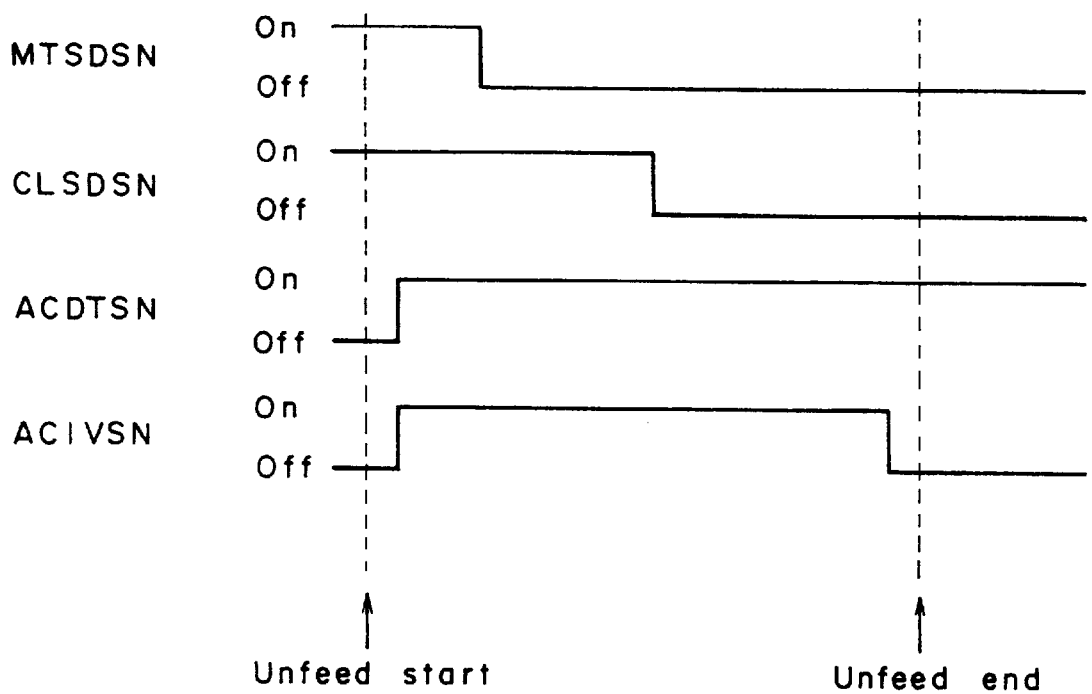
FIG. 23 is a timing chart in returning the cartridge from the accessor to each cell.

FIG. 22 is a flowchart in returning the cartridge from the accessor to the cell, and FIG. 23 is a timing chart of each sensor output in returning the cartridge from the accessor to the cell. First, an output timing of each sensor will be described with reference to FIG. 23. At starting, the cartridge is held in the accessor, so that both MTSDSN and CLSDSN are on, and both ACDTSN and ACIVSN, are off. When the cartridge is returned to the cell (an unfeed operation of the cartridge is started), both ACDTSN and ACIVSN become on. As the unfeed operation of the cartridge proceeds, MTSDSN first becomes off and CLSDSN next becomes off. Finally, when ACIVSN becomes off, the unfeed operation of the cartridge is ended, thereby properly returning the cartridge to the cell.

The flowchart of FIG. 22 will now be described with reference to FIG. 23. In step 601, a feeder motor is backward driven to perform the unfeed operation. That is, when the feeder motor is forward driven, the cartridge is moved from the cell to the accessor or from the accessor to the magnetic tape unit (feed operation), whereas when the feeder motor is backward driven, the cartridge is moved from the magnetic tape unit to the accessor or from the accessor to the cell. In step 602, it is determined whether or not both ACDTSN and ACIVSN are on. This determination step is continuer until both sensors become on. If both sensors become on, the program proceeds to step 603, in which it is determined whether or not ACIVSN has become off. At the time ACIVSN has become off, the cartridge is properly ejected 7o the cell. Accordingly, the program proceeds to step 604, in which the feeder motor is stopped to end the unfeed operation. If ACIVSN does not become off in step 603, the program proceeds to step 605, in which the feeder motor is stopped and an error is set. Then, this routine is ended.

According to this preferred embodiment as mentioned above, the cartridge inverse sensor of the accessor is used not only for detection of inverse of the cartridge, but also for detection of proper return of the cartridge to the cell. Accordingly, the conventional means for detecting only that the cartridge has been properly returned to the cell can be eliminated to thereby allow a reduction in size and cost of the machine.

(3) Use of a common power supply for the magnetic tape unit and the automatic cartridge loader In recent years, size reduction and power saving have become necessary factors in any machines. Also in a magnetic tape machine, size reduction may be attained by using a common power supply for a magnetic tape unit and an automatic cartridge loader, that is, by using one power unit. However, if the use of the common power supply causes an increase ion capacity of the power supply, a large power unit is resultantly required to cause a hindrance to size reduction and weight reduction.

It is therefore an object of this preferred embodiment to use a common power supply for the magnetic tape unit and the automatic cartridge loader without much increasing the capacity of the power supply, thereby attaining the size reduction, weight reduction, and power saving.

In this preferred embodiment, when the cartridge is present in the magnetic tape unit, the automatic cartridge loader is driven under slow-speed control rather than under normal-speed control, so as to suppress the power supply capacity. If manual operation by the operator is performed, the drive of the automatic cartridge loader is not allowed in principle when the cartridge is present in the magnetic tape unit. Otherwise the automatic cartridge loader performs automatic feed. In the case of automatic feed by the automatic cartridge loader, whether or not the cartridge is present in the magnetic tape unit can be recognized by the firmware of the automatic cartridge loader.

In vertically moving the accessor, the presence or absence of the cartridge in the magnetic tape unit is first checked. If the cartridge is absent in the magnetic tape unit, the automatic cartridge loader is driven under normal-speed control, that is, in the sequence of acceleration, constant speed, and deceleration (or acceleration and deceleration). If the cartridge is present in the magnetic tape unit, a minimum current value for driving the accessor is set in the DA converter and the accessor is moved to a target position at a slow speed. Accordingly, the need for increasing the power supply capacity can be eliminated. This feature will be described below more specifically.

Figure 24:
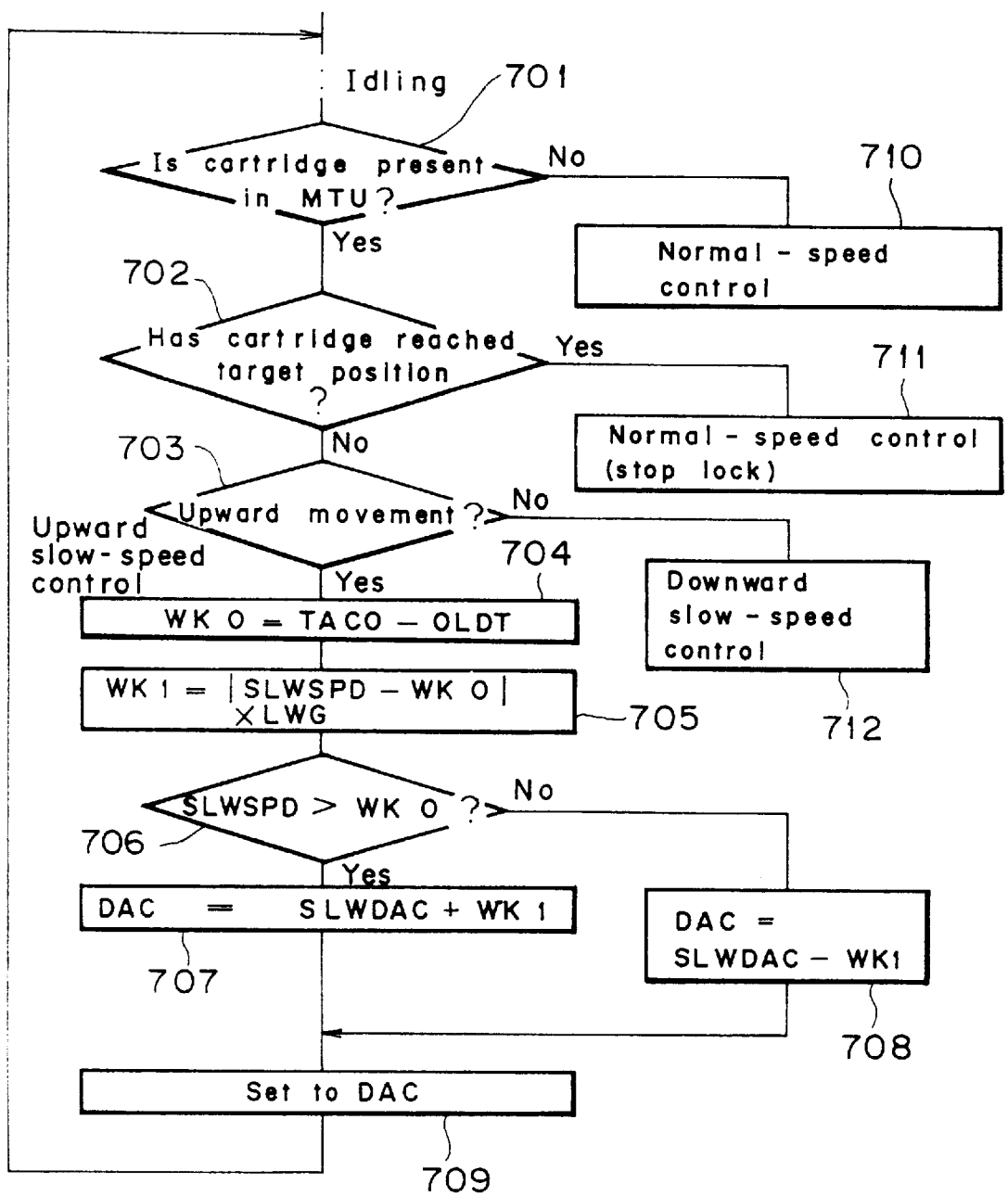
FIG. 24 is a flowchart of slow-speed control according to the present invention.

FIG. 24 is a flowchart showing a specific embodiment of the slow-speed control. Until the cartridge is unloaded from the magnetic tape unit, the cartridge is present in it. Accordingly, when vertically moving the accessor in this condition, the normal-speed control of the accessor is not performed. In vertical movement of the accessor, it is determined whether or not the cartridge is present in the magnetic tape unit (step 701). If the cartridge is absent in the magnetic tape unit, the program proceeds to step 710, in which the normal-speed control is performed. If the cartridge is present in the magnetic tape unit, the program proceeds to step 702, in which it is determined whether or not the accessor has reached a target position. If the accessor has reached the target position, the program proceeds to step 711, in which stop lock control as one mode of the normal-speed control is performed. If the accessor has not reached the target position (step 702), the program proceeds to step 703, in which it is determined whether or not the direction of movement of the accessor is upward. If the direction of movement is not upward, that is, it is downward, the program proceeds to step 712, in which slow-speed control fit for the downward movement is performed.

If the direction of movement is upward (step 703), slow-speed control fit for the upward movement is performed. In both the slow-speed control fit for the downward movement and the slow-speed control fit for the upward movement, the moving speed of the accessor is set to $\frac{1}{10}$ of the normal speed. In other words, a current required by the motor is reduced, so as to suppress the rotational speed of the motor. The routine of this slow-speed control is repeated through idling, and a tachovalue indicating a previous position of the accessor in the previous cycle of the routine is represented by OLDT, whereas a tachovalue indicating a present position of the accessor in the present cycle of the routine is represented by TACO. In step 704, a difference WK0 between TACO and OLDT is calculated (WK0=TACO−OLDT) Then, the value WK0 is compared with a predicted slow speed. That is, in step 705, the absolute value of the difference between the predicted slow speed (SLWSPD) and the value WK0 is multiplied by a gain LWG to obtain an error amount WK1. The gain LWG is a low gain rather than the above-mentioned gain (G0 to Gn) fit in each section. The low gain has a small value, and therefore the error amount cannot be immediately recovered. However, a DAC value can he suppressed to thereby prevent rapid variations in speed.

In seep 706, it is determined whether or not SLWSPD is greater than WK0. If SLWSPD is greater than WK0, this decision shows that the actual speed is low, and the program proceeds to step 707, in which WK1 is added to a DAC value (SLWDAC) required by the slow speed. Then, the value obtained in step 707 is set in the DA converter (step 709). On the other hand, if SLWSPD is not greater than WK0 (step 706), this decision shows that the actual speed is high, and the program proceeds to step 708, in which WK1 is subtracted from the DAC value (SLWDAC) required by the slow speed. Then, the value obtained in step 708 is set in the DA converter (step 709). In this manner, according to this preferred embodiment, the use of a common power supply for the magnetic tape unit and the automatic cartridge loader can be simply realized without increasing the capacity of the common power supply in the machine, thus allowing the size reduction, cost reduction, and power saving.

(4) Control in connecting a library device to the magnetic tape machine

In a magnetic tape machine, a cartridge is used for backup of data in many cases, and a large number of cartridges must be stored. Such a requirement has brought about the appearance of a library device. In the library device, an automatic operation is performed to reduce operator's effort, and an interface between a magnetic tape unit and the library device is conventionally required. In this manner, the conventional library device requires an interface to the magnetic tape unit, and it is necessary to specify commands and parameters from the library device to the magnetic tape unit, thus making hardware, firmware, etc. complicated. In this respect, this preferred embodiment has eliminated the interface between the magnetic tape unit and the library device. This feature will now be described more specifically.

This preferred embodiment is applicable to a magnetic tape machine connectable to the library device, having at least two cells including a cell (which will be hereinafter referred to as "ENTRY") for receiving a cartridge to be processed from the library device and a cell (which will be hereinafter referred to as "EXIT") for receiving a cartridge processed from the accessor. In such a magnetic tape machine, the cartridge presence/absence sensor of the accessor is used to recognize whether or not the cartridge is present in ENTRY/EXIT during vertical movement of the accessor. If the cartridge is present in ENTRY, it is automatically fed 70 the magnetic tape unit. If the cartridge is absent in EXIT, the cartridge is ejected from the magnetic tape unit. Such control can eliminate the need for providing any hard or soft interface between the library device and the magnetic tape machine.

Figure 25:
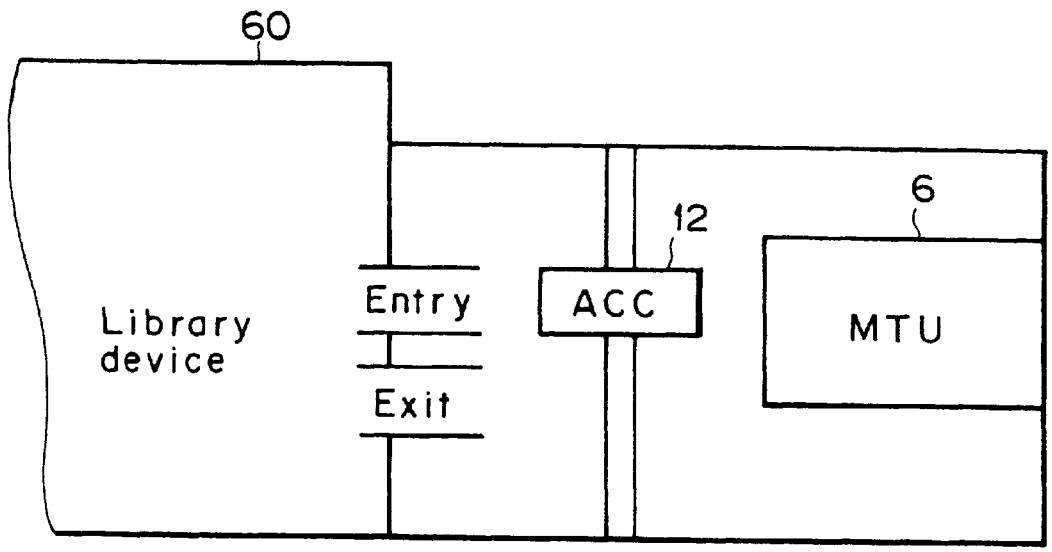
FIG. 25 is a schematic side view in the case where the magnetic tape machine is connected to a library device.

FIG. 25 is a schematic view showing a condition where the magnetic tape machine is connected to a library device 60. ENTRY and EXIT mentioned above are selected from the plural cells 10 of y the cartridge storing member 8 (see FIG. 1), and they are opposed to the library device 60. The cartridge in the library device 60 is loaded through ENTRY into the magnetic tape machine by the accessor 12. Conversely, the cartridge in the magnetic tape machine is unloaded through EXIT to the library device 60 by the accessor 12.

Figure 26:
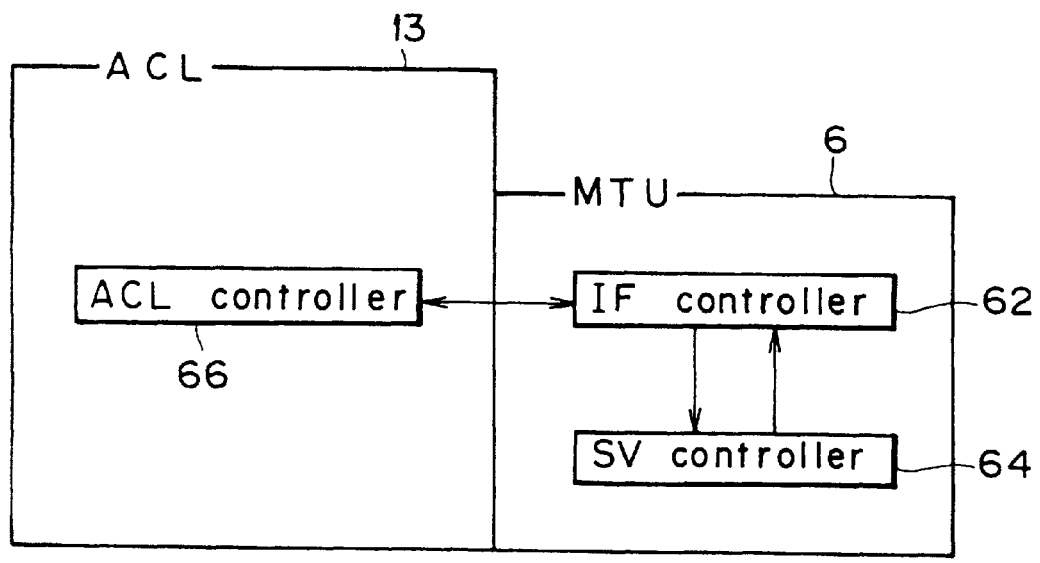
FIG. 26 is a block diagram of a control system in the magnetic tape machine.

FIG. 26 is a block diagram of a control system for controlling the whole of the magnetic tape machine. The control system is composed of three sections, i.e., an IF controller 62 for controlling an interface to a host device, an SV controller 64 for controlling tape travel or the like, and an ACL controller 66 for controlling the automatic cartridge loader 13. The IF controller 62 controls not only the interface to the host device, but also an interface to the SV controller 64 and an interface to the automatic cartridge loader 13. The automatic cartridge loader 13 performs control by commands.

More specifically, the commands include a move command for moving the accessor 12 to a position indicated by a parameter, a load command for loading the cartridge from ENTRY into the magnetic tape unit, and an unload command for unloading the cartridge from the magnetic tape unit into EXIT. The IF controller 62 and the ACL controller 66 are connected together through a hardware bidirectional RAM such a DPRAM (dual port random access memory), and the commands are exchanged through the bidirectional RAM.

Figure 27:
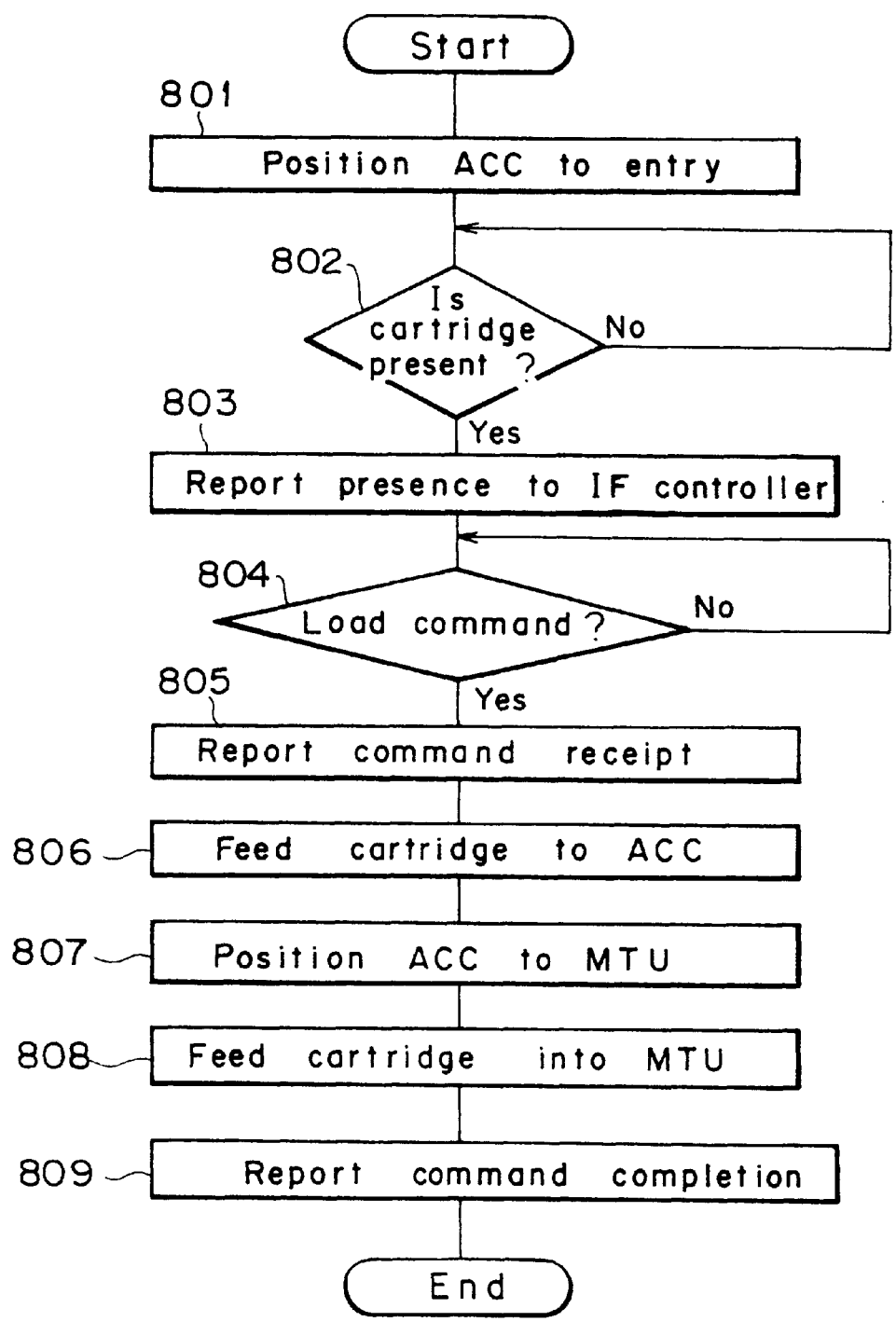
FIG. 27 is a flowchart of cartridge loading according to the present invention.

FIG. 27 is a flowchart of cartridge loading from ENTRY to the magnetic tape unit. In step 801, the accessor 12 is positioned to ENTRY. In step 802, it is determined whether or not the cartridge is present in ENTRY. Whether or not the cartridge has been loaded in ENTRY can be detected by the cartridge presence/absence sensor of the accessor 12. If the cartridge is present in ENTRY, the program proceeds to step 803, in which the presence of the cartridge is reported to the IF controller 62 for controlling the magnetic tape unit 6. Thereafter, the IF controller 62 issues a load command to the automatic cartridge loader 13. The load command is a command for automatically loading the cartridge at the position of the accessor 12 into the magnetic tape unit 6.

When the load command is received by the automatic cartridge loader 13 in step 804, the receipt of the load command is reported to the IF controller 62 of the magnetic tape unit 6 in step 805. Then, in step 806, the cartridge in ENTRY is Led into the accessor 12. Then, in step 807, the accessor 12 is positioned to the magnetic tape unit 6. Then, in step 808, the cartridge in the accessor 12 is inserted (fed) into the magnetic tape unit 6. Finally, in step 809, the automatic cartridge loader 13 reports the completion of the command to the IF controller 62 of the magnetic tape unit.

Figure 28:
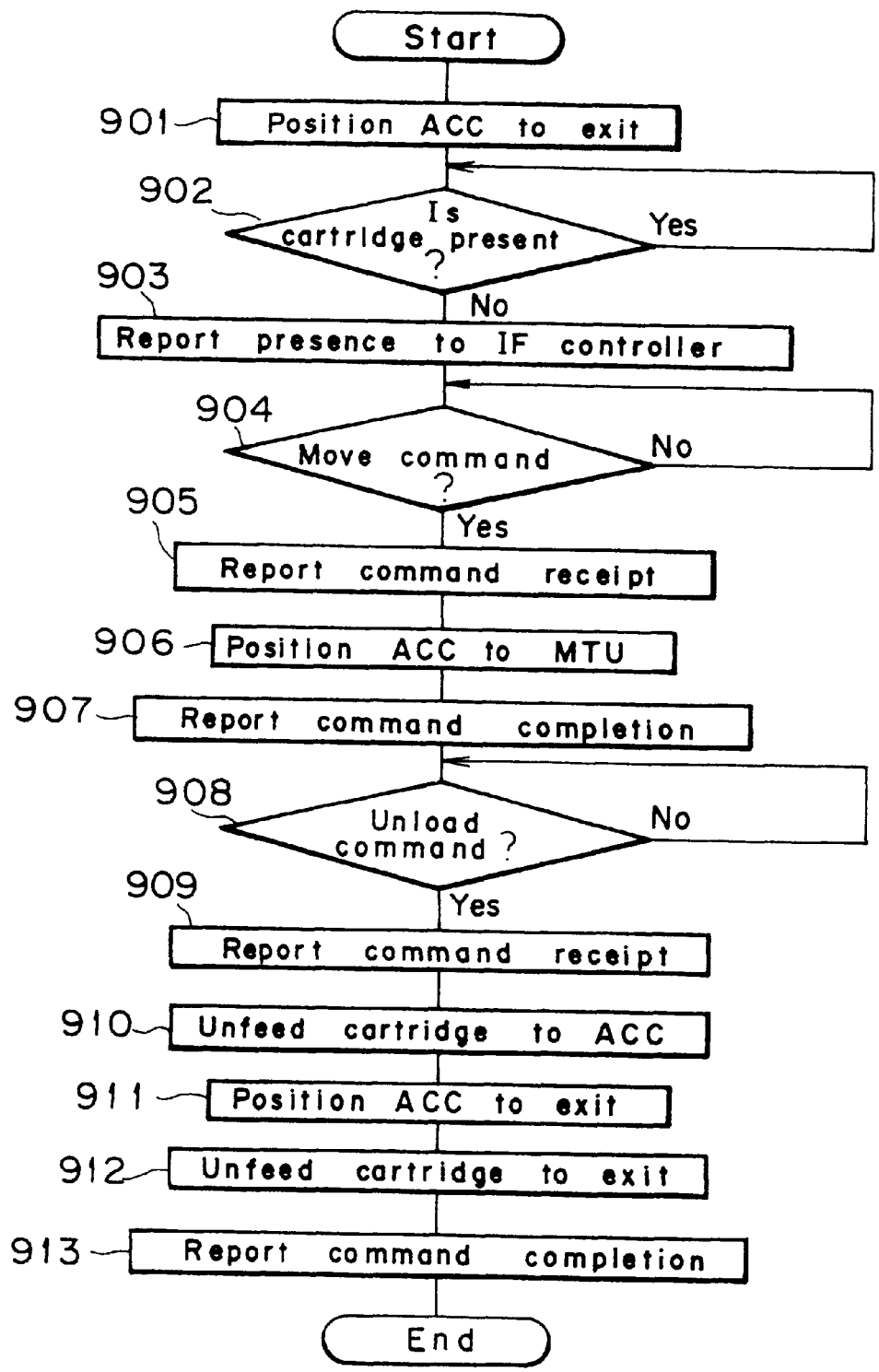
FIG. 28 is a flowchart of cartridge unloading according to the present invention.

FIG. 28 is a flowchart of cartridge loading from the magnetic tape unit to EXIT. In step 901, the accessor 12 is positioned to EXIT. In step 902, it is determined whether or not the cartridge is present in EXIT. If the cartridge is absent in EXIT, the program proceeds to step 903, in which the absence of the cartridge is reported to the IF controller 62. Then, the IF controller 62 issues a move command. If the move command is received by the automatic cartridge loader 13 (step 904), the receipt of the move command is reported to the IF controller 62 (step 905). In step 906, the accessor 12 is positioned to the magnetic tape unit. In step 907, the completion of the move command is reported to the IF controller 62.

The IF controller 62 next issues an unload command. If the unload command is received by the automatic cartridge loader 13 (step 908), the receipt of the unload command is reported to the IF controller 62 (step 909). In step 910, the cartridge in the magnetic tape unit is drawn (unfed) into the accessor 12. In step 911, the accessor 12 is positioned to EXIT. In step 912, the cartridge in the accessor 12 is unfed to EXIT. Finally, in step 913, the completion of the unload command is reported to the IF controller 62. After completing the cartridge unloading, the accessor 12 is positioned to ENTRY to stand by fresh loading of the cartridge. At this time, if the cartridge has already been loaded in ENTRY, the cartridge in ENTRY is fed again to the magnetic tape unit 6. Although the ACL controller 66 moves the accessor 12 in receipt of the command from the IF controller 62, the ACL controller 66 may recognize the loading of the cartridge into ENTRY and feed the cartridge to the magnetic tape unit according to this recognition.

According to this preferred embodiment as mentioned above, no interface between the magnetic tape machine and the library device is required, and hardware, software, cable, etc. associated with the interface can therefore be eliminated, thereby allowing the size reduction, weight reduction, and cost reduction of the machine.

There will now be described with reference to FIGS. 11 to 17B the insert operation of the cartridge into the cell, the transfer operation of the cartridge from the cell to the accessor, the operation when inserting the cartridge into the cell in improper orientation, the transfer operation of the cartridge from the accessor to the cell, and the extract operation of the cartridge from the cell.

INSERT OPERATION OF THE CARTRIDGE INTO THE CELL

At starting insertion of the cartridge 2, the latch mechanism 34 and the improper insertion preventing mechanism 36 are pushed outward by a tapering portion of the leader block 30 (see FIG. 11) to allow the entry of the cartridge 2 into the cell 10.

The cartridge 2 comes into abutment against a central projection 40A of the stopper 40 to push outward the stopper 40. Accordingly, the door 39 locked by an end projection 40B of the stopper 40 is unlocked. Then, the cartridge 2 comes into abutment against the door 39 to open the door 39. At the same time, the flag 42 is rotated in the same direction as that of rotation of the door 39, and the flag 42 is detected by the sensor 44.

When the cartridge 2 comes to a position where it is transferred to the accessor 12, a pawl 34A of the latch 34 engages with the notch 32 (see FIG. 11) formed on one side surface of the cartridge 2, thus latching the cartridge 2. Even if the cartridge 2 is intended to be further inserted in such a latched condition, the cartridge 2 is securely positioned in this condition, because the biasing force of the torsion spring 46 is applied to the latch mechanism 34 horizontally inward of the cell, and the cell is inclined down to the inside of the machine to prevent retraction of the cartridge 2. At this time, a pawl 36A of the improper insertion preventing mechanism 36 is merely in contact with the side surface of the cartridge 2.

TRANSFER OPERATION OF THE CARTRIDGE FROM THE CELL TO THE ACCESSOR

The accessor 12 is positioned to the cell 10 in which the cartridge 2 has just been inserted. Then, the accessor 12 grips the cartridge 2, and simultaneously an arm of the accessor 12 pushes an end portion of the latch mechanism 34 opposite to the pawl 34A, thereby canceling the latched condition of the cartridge 2. When the accessor 12 starts drawing in the cartridge 2, the stopper 40 disengages from the cartridge 2 and returns to its original condition. Further, the door 39 disengages from the cartridge 2 and starts closing. At this time, the stopper 40 is previously returned to its original closed condition, and the door 39 is then returned to its original closed condition as opening the stopper 40 with a tapering portion of the end projection 40B urged outward by the biasing force of the coil spring 52.

OPERATION WHEN INSERTING THE CARTRIDGE INTO THE CELL IN IMPROPER ORIENTATION

In the event that the cartridge 2 is inserted either from its rear end or from its rear end and upside down, the pawl 36A of the improper insertion preventing mechanism 36 comes to engagement with the notch 32 on the other side surface of the cartridge 2 just after insertion. Accordingly, before the cartridge 2 comes into abutment against the central projection 40A of the stopper 40, the cartridge 2 is inhibited from being further inserted.

In the event that the cartridge 2 is inserted upside down only, the cartridge 2 is allowed to be fully inserted into the cell 10, but the pawl 36A of the improper insertion preventing mechanism 36 rather than the pawl 34A of the latch mechanism 34 is engaged with the notch 32 formed on one side surface of the cartridge 2. As shown in FIG. 17B, the length of a portion of the improper insertion preventing mechanism 36 opposite to the pawl 35A with respect to the axis of rotation of the mechanism 36 is smaller than the length of a portion of the latch mechanism 34 opposite to the pawl 34A with respect to the axis of rotation of the mechanism 34 which is common to the axis of rotation of the mechanism 36. In addition, the improper insertion preventing mechanism 36 is located above the latch mechanism 34. Therefore, even if the accessor 12 grasps the cartridge 2 to draw in it, the arm of the accessor 12 merely pushes the end portion of the latch mechanism 34 opposite to the pawl 34A, and the pawl 36A of the improper insertion preventing mechanism 36 remains engaged with the notch 32 of the cartridge 2. Accordingly, the accessor 12 cannot draw in the cartridge 2.

TRANSFER OPERATION OF THE CARTRIDGE FROM THE ACCESSOR TO THE CELL

After the cartridge 2 is processed in the magnetic tape unit, the cartridge 2 is returned to the original cell 10 by the accessor 12. First, the accessor 12 holding the processed cartridge 2 is positioned to the original cell 10. As similar to the above operation that the accessor 12 draws in the cartridge 2 from the cell 10, the arm of the accessor 12 pushes the end portion of the latch mechanism 34 opposite to the pawl 34A. Then, transfer of the cartridge 2 from the accessor 12 to the cell 10 is started. First, the cartridge 2 pushes the tapering portion of the end projection 40B of the stopper 40 to open the stopper 40. Then, the cartridge 2 comes into abutment against the door 39 to open the door 39. At the same time, the flag 42 is rotated in the same direction as that of rotation of the door 39. At this time, however, the flag 42 is not detected by the sensor 44.

The cartridge 2 comes into abutment against the pawl 36A of the improper insertion preventing mechanism 36 to push out-ward the pawl 36A and accordingly open the mechanism 36. The accessor 12 carries the cartridge 2 to a position slightly beyond the transfer position mentioned above. When the accessor 12 stops carrying the cartridge 2 and releases the cartridge 2, the latch mechanism 34 is closed to result in abutment of the pawl 34A against one side surface of the cartridge 2. Since the cell 10 is inclined, the cartridge 2 slides down on the bottom surface of the cell 10 until the pawl 34A of the latch mechanism 34 comes into engagement with the notch 32 formed on the side surface of the cartridge 2. When the pawl 34A engages with the notch 32, the cartridge 2 is latched.

EXTRACT OPERATION OF THE CARTRIDGE FROM THE CELL

When the cartridge 2 is merely pulled, the edge of the notch 32 of the cartridge 2 pushes a tapering portion of the pawl 34A of the latch mechanism 34 to open the latch mechanism 34. Thus, the cartridge 2 can be easily extracted from the cell 10.

Having thus described a specific embodiment of the present invention applied to a magnetic tape machine, it is to be noted that the present invention may be applied to any machine using a similar cartridge recording medium, such as storage apparatus, without limitation to the magnetic tape machine.

In a conventional magnetic tape machine, a cartridge to be processed is preliminarily stored in a magazine, and the magazine is then set in the machine. Thereafter, a door is closed, and various instructions such as start and end instructions of a process are entered from an operation panel. Accordingly, the conventional magnetic tape machine has the following disadvantages from the viewpoint of convenience in use.

(a) The operator must preliminarily store the cartridge to be processed into the magazine and then set the magazine into the machine.

(b) Every time the operator sets the magazine into the machine or removes the magazine from the machine, the operator must open or close the door.

(c) A plurality of cartridges can be stored in the magazine, and the magazine storing the plural cartridges is set into the machine or removed from the machine. Accordingly, it is difficult to perform quick handling of the cartridges such that the processed cartridge only is quickly removed from the machine and another fresh cartridge is then set into the machine to continue the process.

Further, in the conventional magnetic tape machine, a driving mechanism for the accessor has a timing belt to be driven by a motor, and the accessor fixed to the timing belt is vertically moved by driving the motor. Accordingly, when a machine power is turned off to turn off a motor power, a driving torque of the motor becomes zero to cause free rotation of the timing belt due to the weight of the accessor. As a result, the accessor falls undesirable. To cope with this problem, the following techniques have been adopted in the prior art.

(a) A gear motor with a large reduction ratio is used as the motor for driving the belt.

(b) A balancer having substantially the same weight as that of he accessor is used to prevent the accessor from falling.

(c) an electromagnetic brake is used to prevent free rotation of the motor even when the motor power is turned off.

However, these techniques have the following defects.

(a) The use of the gear motor with a large reduction ratio causes a reduction in driving speed of the belt, so that high-speed movement of the accessor cannot be achieved to reduce a process speed.

(b) The use of the balancer causes a difficulty of reduction in weight and size of the machine.

(c) The electromagnetic brake is a relatively expensive part, which hinders a cost reduction.

According to an aspect of the present invention, there is provided a magnetic tape machine comprising a magnetic tape unit for performing read and write of data on a magnetic recording medium; at least one cell for storing the magnetic recording medium, the cell being inclined down to the inside of the machine; a housing having an opening for allowing direct insertion of the magnetic recording medium from the outside of the machine into the cell and direct ejection of the magnetic recording medium from the cell to the outside of the machine; an accessor for transferring the magnetic recording medium between the cell and the magnetic tape unit; a string screw threadedly engaged with the accessor; and driving means for rotationally driving the string screw.

With this arrangement, no door is provided in the cell on its operator side, thereby allowing the operator to directly insert the cartridge into the cell and directly eject the cartridge from the cell. Accordingly, the operability can be improved. For example, the cartridge to be processed is set in an arbitrary cell, and the cartridge processed in the magnetic tape unit and returned to the cell is ejected from the cell. Subsequently, another fresh cartridge is next inserted into the cell to continue the process, thus allowing quick processing.

As mentioned in the previous preferred embodiment, whether or not the cartridge returned to the cell has been processed can be determined by indication of the LED provided corresponding to each cell (e.g., indication by color), thereby eliminating the possibility of ejection error.

Preferably, an improper insertion preventing mechanism for preventing improper insertion of the cartridge into the cell is provided in each cell. With this arrangement, if the cartridge is improperly inserted into the cell, the improper insertion preventing mechanism serves to prevent the cartridge from being fully inserted into the cell, thereby improving the operability.

Preferably, each cell is fixed in the machine so as to be inclined down to the inside of the machine, in order to prevent the cartridge stored in the cell from falling to the outside of the machine because of vibration or the like. The prevention of falling of the cartridge may be ensured by providing a latch in each cell. With this arrangement, even when the cartridge is inserted into the cell by a large force applied from the operator, the cartridge is held in place by the latch, thereby improving the operability.

According to the above aspect of the present invention, the accessor is threadedly engaged with the string screw, and is vertically moved by rotating the string screw. Accordingly, when a driving power applied to the driving means is turned off, there is no possibility that the string screw may freely rotate to cause falling of the accessor. In this connection, various mechanisms for preventing falling of the accessor can be eliminated to allow high-speed driving of the accessor. Accordingly, a wait time for ejection of the cartridge processed by the magnetic tape unit can be reduced, and a feed time required to feed the cartridge from the cell to the magnetic tape unit can also be reduced, thereby allowing quick exchange of cartridges and improving read/write throughput.

Further, a plurality of cells having the same share may be stacked. In this structure, an arbitrary number of stacks of cells may be obtained. In the case where each cell is fabricated by resin molding, a common mold can be used to thereby allow a reduction in production cost.

The present invention is not limited to the details of the above preferred embodiments. The scope of the invention is defined by the appended claims, and all changes and modifications as fall within the equivalence of the scope of the claims are therefore to be embraced by the invention.

What is claimed is:

1. A magnetic tape machine comprising:

a magnetic tape unit for performing read and write of data on a magnetic recording medium;

at least one cell for storing said magnetic recording medium, said at least one cell being inclined downward toward an interior portion of said magnetic tape machine;

a housing having an opening for allowing direct insertion of said magnetic recording medium from outside of said magnetic tape machine into said at least one cell and direct ejection of said magnetic recording medium from said at least one cell to the exterior of said magnetic tape machine;

an accessor for transferring said magnetic recording medium between said at least one cell and said magnetic tape unit;

each said at least one cell being provided with a safety mechanism incorporating a door, said safety mechanism preventing opening of said door while said magnetic recording medium is being inserted/withdrawn from said respective cell by said accessor;

a string screw threadedly engaged with said accessor;

driving means for rotationally driving said string screw;

wherein said at least one cell has an improper insertion preventing mechanism for preventing full insertion of said magnetic recording medium into said at least one cell in improper orientation of said magnetic recording medium; and said improper insertion preventing mechanism includes a pawl for engaging with a notch formed on a side surface of said magnetic recording medium.

2. A magnetic tape machine comprising:

a magnetic tape unit for performing read and write of data on a magnetic recording medium;

at least one cell for storing said magnetic recording medium, said at least one cell being inclined downward toward an interior portion of said magnetic tape machine;

a housing having an opening for allowing direct insertion of said magnetic recording medium from outside of said magnetic tape machine into said at least one cell and direct ejection of said magnetic recording medium from said at least one cell to the outside of said magnetic tape machine;

an accessor for transferring said magnetic recording medium between said at least one cell and said magnetic tape unit;

each said at least one cell being provided with a safety mechanism incorporating a door, said safety mechanism preventing opening of said door while said magnetic recording medium is being inserted/withdrawn from said respective cell by said accessor;

a string screw threadedly engaged with said accessor;

driving means for rotationally driving said string screw;

wherein said at least one cell has a latch mechanism for positioning said magnetic recording medium inserted into said at least one cell at a transfer position where said magnetic recording medium is transferred to said accessor;

said latch mechanism includes a pawl for engaging with a notch formed on a side surface of the magnetic recording medium; and said access includes means for canceling the latched condition of said magnetic recording medium.

3. A storage apparatus comprising:

a drive unit for performing access of data on a cartridge recording medium;

at least one cell for storing said cartridge recording medium, said at least one cell being inclined downward toward an interior portion of said storage apparatus;

a housing having an opening for allowing direct insertion of said cartridge recording medium from outside of said storage apparatus into said at least one cell and direct ejection of said cartridge recording medium from said at least one cell to the outside of said storage apparatus;

an accessor for transferring said cartridge recording medium between said at least one cell and said drive unit;

each said at least one cell being provided with a safety mechanism incorporating a door, said safety mechanism preventing opening of said door while said cartridge recording medium is being inserted/withdrawn from said respective cell by said accessor;

a string screw threadedly engaged with said accessor;

driving means for rotationally driving said string screw;

wherein said at least one cell has a latch mechanism for positioning said cartridge recording medium inserted into said at least one cell at a transfer position where said cartridge recording medium is transferred to said accessor;

said latch mechanism includes a pawl for engaging with a notch formed on a side surface of the cartridge recording medium; and said accessor includes means for canceling the latched condition of said cartridge recording medium.

4. A storage apparatus comprising:

a drive unit for performing access of data on a cartridge recording medium;

at least one cell for storing said cartridge recording medium, said at least one cell being inclined downward toward an interior portion of said storage apparatus;

a housing having an opening for allowing direct insertion of said cartridge recording medium from the outside of said storage apparatus into said at least one cell and direct ejection of said cartridge recording medium from said at least one cell to the outside of said storage apparatus;

an accessor for transferring said cartridge recording medium between said at least one cell and said drive unit;

each said at least one cell being provided with a safety mechanism incorporating a door, said safety mechanism preventing opening of said door while said cartridge recording medium is being inserted/withdrawn from said respective cell by said accessor;

a string screw threadedly engaged with said accessor;

driving means for rotationally driving said string screw;

wherein said at least one cell has an improper insertion preventing mechanism for preventing full insertion of said cartridge recording medium into said at least one cell in improper orientation of said cartridge recording medium; and said improper insertion preventing mechanism includes a pawl for engaging with a notch formed on a side surface of said cartridge recording medium.

* * * * *